United States Patent
Heu et al.

(10) Patent No.: US 10,908,399 B2
(45) Date of Patent: Feb. 2, 2021

(54) OPTICAL LENS ASSEMBLY AND ELECTRONIC APPARATUS INCLUDING THE SAME

(71) Applicant: Samsung Electronics Co., Ltd., Gyeonggi-do (KR)

(72) Inventors: Min Heu, Seoul (KR); Yong-jae Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 238 days.

(21) Appl. No.: 16/015,505

(22) Filed: Jun. 22, 2018

(65) Prior Publication Data
US 2019/0004286 A1    Jan. 3, 2019

(30) Foreign Application Priority Data
Jun. 30, 2017 (KR) .................. 10-2017-0083611

(51) Int. Cl.
*G02B 15/14* (2006.01)
*G02B 13/00* (2006.01)
*G02B 13/02* (2006.01)

(52) U.S. Cl.
CPC ..... *G02B 15/1421* (2019.08); *G02B 13/0045* (2013.01); *G02B 13/02* (2013.01); *G02B 15/142* (2019.08); *G02B 15/143* (2019.08); *G02B 15/143101* (2019.08); *G02B 15/143105* (2019.08)

(58) Field of Classification Search
CPC .... G02B 15/143103; G02B 15/143107; G02B 13/02; G02B 15/1421; G02B 15/142
See application file for complete search history.

(56) References Cited

U.S. PATENT DOCUMENTS

| | | | |
|---|---|---|---|
| 9,557,627 B2 | 1/2017 | Mercado | |
| 9,568,712 B2 | 2/2017 | Dror et al. | |
| 2012/0262806 A1* | 10/2012 | Huang | G02B 13/0045 359/784 |
| 2013/0016261 A1* | 1/2013 | Tanaka | G02B 13/0045 348/294 |
| 2016/0274339 A1 | 9/2016 | Lee | |

FOREIGN PATENT DOCUMENTS

EP        2 555 034 A1     2/2013

OTHER PUBLICATIONS

European Search Report dated Nov. 30, 2018.

* cited by examiner

*Primary Examiner* — Wen Huang
(74) *Attorney, Agent, or Firm* — Cha & Reiter, LLC

(57) ABSTRACT

Provided are an optical lens assembly and an electronic apparatus including the same. The optical lens assembly includes a first lens group and a second lens group that are arranged from an object side to an image side, wherein the first lens group has positive refractive power and is fixed during focusing, and the second lens group moves along an optical axis for focusing.

16 Claims, 14 Drawing Sheets

OPTICAL LENS ASSEMBLY AND ELECTRONIC APPARATUS INCLUDING THE SAME

CROSS-REFERENCE TO RELATED APPLICATION(S)

This application is based on and claims priority under 35 U.S.C. § 119 to Korean Patent Application No. 10-2017-0083611, filed on Jun. 30, 2017, in the Korean Intellectual Property Office, the disclosure of which is incorporated by reference herein in its entirety.

BACKGROUND

1. Field

Various embodiments of the present disclosure generally relate to optical lens assemblies and electronic apparatuses including the same, and more particularly, to a small optical lens assembly that performs inner-focus-type focusing and has a telephoto field of view, and an electronic apparatus including the small optical lens assembly.

2. Description of Related Art

The variety of services and functions provided by electronic apparatuses is gradually expanding. Electronic apparatuses such as mobile devices may provide various services using various sensor modules. Also, these electronic apparatuses may provide multimedia services, e.g., photo services or video services. As the use of these electronic apparatuses has increased, the use of cameras functionally connected to the electronic apparatuses has become increasingly popular. With this increase in popularity, for example, the performance and/or resolution of the cameras of electronic apparatuses have improved. These cameras may be used to take various types of pictures such as landscape pictures, pictures of people, and selfies. Multimedia files such as pictures or videos may be shared on social network sites or other media.

Recently, there has been increasing user demand for the cameras of the electronic apparatuses to preform functions of high-end cameras such as professional cameras. Accordingly, there is growing demand for devices capable of taking pictures from various angles of view, such as those from wide-angle lenses or telephoto lenses.

In addition, as the demand for miniaturized camera modules in portable terminals has greatly increased, the pixel density of image sensors such as charge-coupled devices (CCDs) and complementary metal-oxide semiconductors (CMOSs) used in such miniaturized camera modules has also increased. In order to increase the pixel density of image sensors and obtain high-quality images, optical lens assemblies used in miniaturized camera modules of portable terminals need to have excellent optical performance. In addition, it is preferable that such optical lens assemblies are capable of taking pictures from various angles of view and have compact designs for easy portability.

SUMMARY

Provided are optical lens assemblies that may obtain images at a telephoto field of view in electronic apparatuses (e.g., portable terminals).

Provided are electronic apparatuses including optical lens assemblies that may obtain images at a telephoto field of view.

Provided are electronic apparatuses including a plurality of optical lens assemblies and capable of performing a multi-module zoom operation.

Additional aspects will be set forth in part in the description which follows and, in part, will be apparent from the description, or may be learned by practice of the presented embodiments.

In accordance with an aspect of the disclosure, an optical lens assembly includes: a first lens group having positive refractive power and is fixed during focusing; and a second lens group configured to move along an optical axis for focusing, wherein the first lens group and the second lens group are arranged from an object side to an image side, and the optical lens assembly satisfies the following formula:

$$5 < \frac{TTL}{\mathrm{Tan}\theta} < 40$$

where TTL denotes a total length of the optical lens assembly, and $\theta$ denotes a half field of view angle of the optical lens assembly when focusing at an infinite object distance.

In accordance with another aspect of the disclosure, an optical lens assembly includes: a first lens group fixed during focusing; and a second lens group configured to move along an optical axis for focusing, wherein the first lens group and the second lens group are arranged from an object side to an image side, and the optical lens assembly satisfies the following formula:

$$-2.0 < f_w/f_i < 0$$

where $f_i$ denotes a total focal length of the optical lens assembly when focusing at an infinite object distance, and $f_w$ denotes a focal length of the second lens group.

In accordance with another aspect of the disclosure, an electronic apparatus includes: an optical lens assembly; and an image sensor configured to receive light from the optical lens assembly, wherein the optical lens assembly includes: a first lens group having positive refractive power and is fixed during focusing; and a second lens group configured to move along an optical axis for focusing, wherein the first lens group and the second lens group are arranged from an object side to an image side, and the optical lens assembly satisfies the following formula:

$$5 < \frac{TTL}{\mathrm{Tan}\theta} < 40$$

where TTL denotes a total length of the optical lens assembly, and $\theta$ denotes a half field of view angle of the optical lens assembly when focusing at an infinite object distance.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
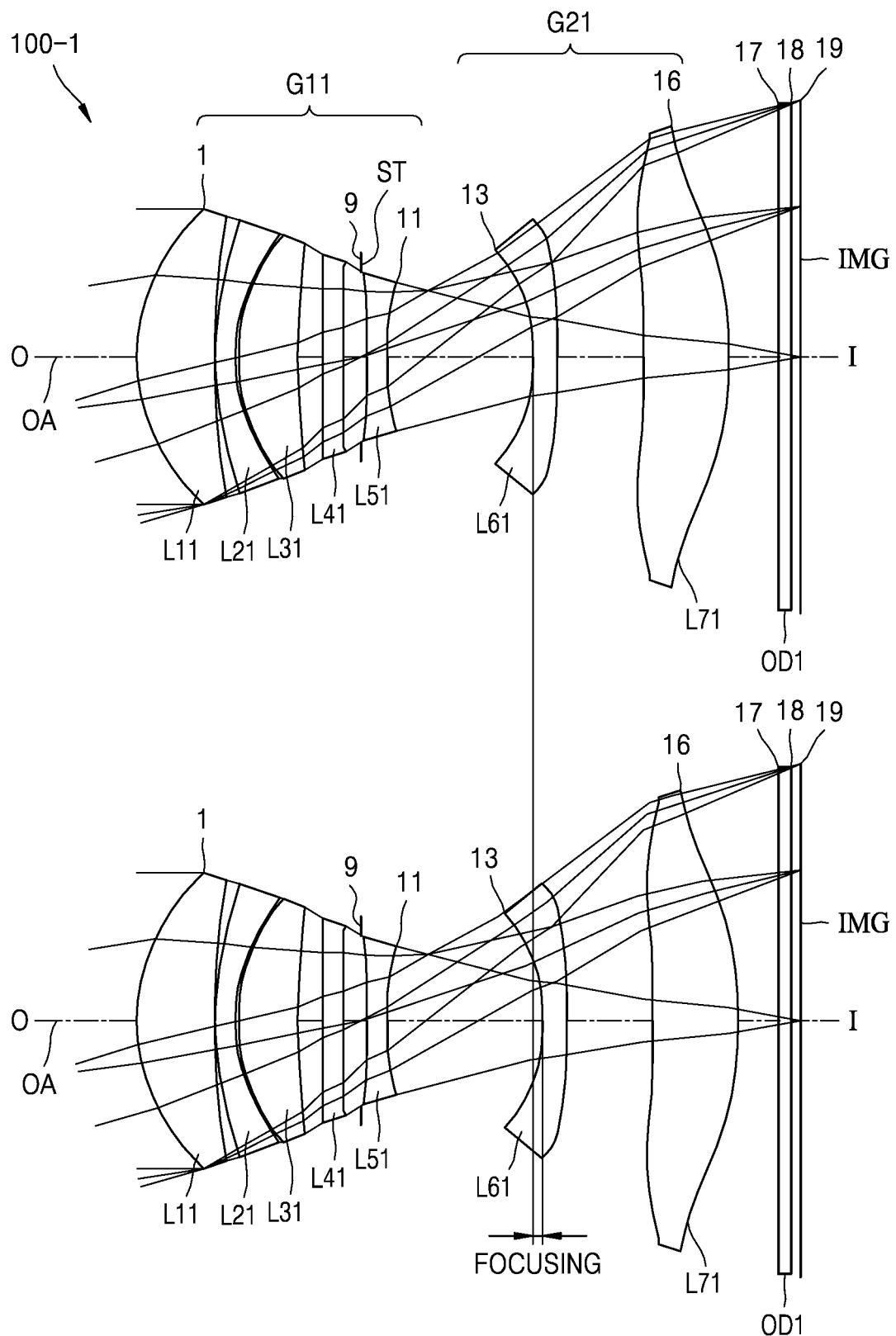
FIG. 1 illustrates an optical lens assembly of a first embodiment of the present disclosure.

Hereinafter, various embodiments of the present disclosure will be described with reference to the accompanying drawings. However, it should be understood that the present disclosure is not limited to these particular embodiments but also includes various modifications, equivalents, and/or alternatives thereof. Throughout the specification and drawings, like reference numerals may be used to denote like elements or components.

When used herein, terms such as "comprise," "include," and "have" specify the presence of stated features (e.g., values, functions, operations, parts, elements, and components) but do not preclude the presence or addition of one or more other features.

As used herein, expressions such as "A or B," "at least one of A and/or B," and "one or more of A and/or B" may include any and all combinations of one or more of the associated listed items. For example, "A or B," "at least one of A and B," or "at least one of A or B" may denote all of the cases of (1) including at least one A, (2) including at least one B, and (3) including at least one A and at least one B.

Terms such as "first" and "second" used herein may refer to corresponding components without implying an order of importance, and are used merely to distinguish each component from the others without unduly limiting the components. For example, a first user device and a second user device may refer to different user devices regardless of their order or relative importance. For example, without departing from the scope of the present disclosure, a first component may be referred to as a second component, and vice versa.

It will be understood that when a component (e.g., a first component) is referred to as being "(operatively or communicatively) coupled to/with" or "connected to/with" another component (e.g., a second component), it may be coupled to/with or connected to/with the other component directly or indirectly through one or more other components (e.g., third components). On the other hand, when a component (e.g., a first component) is referred to as being "directly coupled to/with" or "directly connected to/with" another component (e.g., a second component), no other components (e.g., third components) exist therebetween.

The expression "configured to (or set to)" used herein may be replaced with, for example, "suitable for," "having the capacity to," "designed to," "adapted to," "made to," or "capable of," depending on the usage. The expression "configured to (or set to)" may not necessarily mean "specifically designed to" at the hardware level. Instead, in some case, the expression "apparatus configured to . . . " may mean that the apparatus is "capable of . . . " along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory device.

The terms used herein are just for the purpose of describing particular embodiments and are not intended to limit the scope of the present disclosure. As used herein, the singular forms "a," "an," and "the" may include the plural forms as well, unless the context clearly indicates otherwise. All terms (including technical or scientific terms) used herein may have the same meanings as commonly understood by one of ordinary skill in the art of the present disclosure. In some cases, even the terms defined herein may not be interpreted to exclude the embodiments of the present disclosure.

An electronic apparatus according to various embodiments may include, for example, at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Motion Picture Expert Group (MPEG) audio layer 3 (MP3) player, a mobile medical device, a camera, and a wearable device. According to various embodiments, the wearable device may include at least one of accessory-type devices (e.g., watches, rings, wristlets, anklets, necklaces, spectacles, contact lenses, or head-mounted devices (HMDs)), textile or clothing-integrated devices (e.g., electronic clothing), body-attachable devices (e.g., skin pads or tattoos), and bio-implantable devices (e.g., implantable circuits).

In some embodiments, the electronic apparatus may be a home appliance. The home appliance may include, for example, at least one of a television (TV), a digital video disk (DVD) player, an audio device, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Goggle TV™), a game console (e.g., Xbox™ or PlayStation™), an electronic dictionary, an electronic key, a camcorder, and an electronic picture frame.

In other embodiments, the electronic apparatus may include at least one of any type of medical device (e.g., any type of portable medical meter (such as a blood sugar meter, a heart rate meter, a blood pressure meter, or a body temperature meter), a magnetic resonance angiography (MRA) device, a magnetic resonance imaging (MRI) device, a computed tomography (CT) device, a tomography, or an ultrasound machine), a navigation device, a global navigation satellite system (GNSS), an event data recorder (EDR), a flight data recorder (FDR), an automotive infotainment device, an electronic ship equipment (e.g., a ship navigation device or a gyrocompass), an avionic device, a security device, a vehicle head unit, an industrial or home robot, an automatic teller machine (ATM) of a financial institution, a point-of-sale (POS) device of a store, and an Internet-of-Things (IoT) device (e.g., an electric bulb, any type of sensor, an electricity or gas meter, a sprinkler, a fire alarm, a thermostat, a street lamp, a toaster, an exercise equipment, a hot-water tank, a heater, or a boiler).

According to some embodiments, the electronic apparatus may include at least one of a part of furniture or building/structure, an electronic board, an electronic signature receiving device, a projector, and any type of meter (e.g., a water meter, an electricity meter, a gas meter, or a radio wave meter). In various embodiments, the electronic apparatus may be any one or any combination of the above-described various devices. The electronic apparatus according to some embodiments may be a flexible electronic apparatus. Also, the electronic apparatus according to the embodiments of the present disclosure is not limited to the above-described devices and may include new electronic apparatuses resulting from technology development.

Hereinafter, the optical lens assemblies and electronic apparatuses according to various embodiments will be described with reference to the accompanying drawings. As used herein, the term "user" may refer to a person using the electronic apparatus, or an apparatus (e.g., an artificial intelligence (AI) electronic apparatus) using the electronic apparatus.

Hereinafter, optical lens assemblies and image forming methods using the same according to various embodiments will be described in detail with reference to the accompanying drawings.

FIG. 1 illustrates an optical lens assembly 100-1 of a first embodiment of the present disclosure.

The optical lens assembly 100-1 according to the first embodiment may include a first lens group G11 and a second lens group G21 arranged from an object side O to an image side I. Focusing is performed by using the lens group G21. Hereinafter, for describing the configuration of each lens, for example, the image side I may refer to the side facing the image plane IMG on which an image is formed, and the object side O may refer to the side facing an object. Also, for example, an "object-side surface" of a lens may refer to the lens surface facing the object along the optical axis OA (i.e., the left surface in the drawings), and an "image-side surface" thereof may refer to the lens surface facing the image plane IMG along the optical axis OA (i.e., the right surface in the drawings). The image plane IMG may be, for example, the surface of an imaging device or the surface of an image sensor. The image sensor may include, for example, a sensor such as a complementary metal-oxide semiconductor (CMOS) or a charge-coupled device (CCD). The image sensor is not limited thereto and may be, for example, any device that converts images of the object into electrical image signals.

The first lens group G11 may have positive refractive power and may be fixed during focusing. The second lens group G21 may move along the optical axis OA for focusing. The second lens group G21 may have positive or negative refractive power.

The optical lens assembly 100-1 according to the first embodiment may be an inner-focus-type lens assembly where the first lens group G11 located closest to the object side O is fixed during focusing and where the total length of the optical lens assembly 100-1 is not changed.

A camera attached to a mobile device such as a mobile phone may generally include a wide-angle lens having a field of view of 70°. However, because taking pictures using mobile devices has recently become popular, an increasing number of users want to take pictures from other angles of view. To this end, the optical lens assembly 100-1 according to the first embodiment may include a telephoto lens system having a focal length that is two to four times greater than the focal length of a wide-angle lens.

Also, one of the most important specifications of the mobile device is its size. Typically, miniaturized optical lens assemblies are advantageous because, using a miniaturized optical lens assembly, the size of the mobile device can be minimized. Accordingly, the optical lens assembly 100-1 according to the first embodiment may be miniaturized by fixing the first lens group G11 located closest to the object side O. The optical lens assembly 100-1 according to the first embodiment may have a field of view ranging from about 25° to about 50°.

The optical lens assembly 100-1 according to the first embodiment may have a field of view of, for example, 33°. The first lens group G11 may include a first lens L11 having positive refractive power, a second lens L21 having negative refractive power, and a third lens L31 having positive refractive power. The first lens group G11 may include a fourth lens L41 having negative refractive power and a fifth lens L51 having positive refractive power. The first lens L11 may have, for example, a meniscus shape convex toward the object side O. The second lens L21 may have, for example, a meniscus shape convex toward the object side O. The third lens L31 may have, for example, a meniscus shape convex toward the object side O. The fourth lens L41 may have, for example, a meniscus shape convex toward the object side O. The fifth lens L51 may be, for example, a biconcave lens. However, shapes of each lens are not limited thereto.

In order to achieve compact size for the optical lens assembly 100-1, the configuration of the first lens group G11 is important. The telephoto ratio of the optical lens assembly 100-1 may be an indication of the size of the optical lens assembly 100-1. The telephoto ratio may refer to the ratio of the total length of the optical lens assembly 100-1 to the focal length. In order to have a small telephoto ratio, lenses of the first lens group G11 close to the object side O have meniscus shapes convex toward the object side O. To this end, the first lens L11, the second lens L21, and the third lens L31 may have strong refractive powers and also have meniscus shapes convex toward the object side O.

The first lens group G11 may include a stop ST. The stop ST may be provided between, for example, the fourth lens L41 and the fifth lens L51. The stop ST may adjust the diameter of a light beam entering the optical lens assembly 100-1. Examples of the stop ST may include an aperture stop, a variable stop, and a mask-type stop.

The second lens group G21 may move along the optical axis OA toward the image side I during focusing as the distance between the object and the optical lens assembly 100-1 changes. The second lens group G21 may have negative refractive power. The second lens group G21 may include one or two lenses. The second lens group G21 may move more rapidly during focusing when the number of lenses of the second lens group G21 is kept at a minimum. The second lens group G21 may include, for example, a sixth lens L61 having negative refractive power and a seventh lens L71 having positive refractive power. The sixth lens L61 may have a meniscus shape convex toward the image side I. The seventh lens L71 may have at least one inflection point. The inflection point may refer to, for example, a point at which the sign of the radius of curvature changes from (+) to (−) or from (−) to (+). Alternatively, the inflection point may refer to, for example, a point at which the shape of a lens changes from convex to concave or from concave to convex. The radius of curvature may refer to, for example, the value indicating a degree of curvature at each point of a curved surface or a curved line. For example, the seventh lens L71 may have a least one inflection point on the image-side surface 16. Alternatively, for example, the seventh lens L71 may have at least one inflection point on each of the object-side surface and the image-side surface 16. In the object-side surface of the seventh lens L71, a central lens portion may be concave from the object side O and a peripheral lens portion may be convex toward the object side O. In the image-side surface 16 of the seventh lens L71, a central lens portion may be convex toward the image side I and a peripheral lens portion may be concave from the image side I.

Focusing is performed by using only the second lens group G21 and aberrations of the optical lens assembly 100-1 are corrected by using the first lens group G11. In order to correct aberrations, the first lens group G11 may include a plurality of positive lenses and at least one negative lens. The first lens group G11 may appropriately correct aberrations such as chromatic aberration, spherical aberration, coma, and astigmatism, which may exist in a telephoto lens system having a long focal length.

In order to have excellent optical performance even at low illumination intensity, a telephoto lens as well as a wide-angle lens may require large aperture lenses. To this end, lenses close to the object side O may have strong refractive powers. For example, the first lens L11 may have a convex object-side surface having strong refractive power. However, in this case, spherical aberration may be increased. In order to reduce the spherical aberration, the first lens L11 may include at least one aspherical surface. Accordingly, the optical lens assembly 100-1 may include a large aperture lens in which a spherical aberration is appropriately corrected.

Also, since the second lens group G21 is located close to the image side I, it is necessary that the change in the performance of the peripheral lens portions is small. To this end, the second lens group G21 may include at least one aspherical lens. Accordingly, astigmatism may be easily corrected.

Although it is possible that the second lens group G21 includes one lens, the second lens group G21 may include two lenses such as a positive lens and a negative lens, in order to reduce the change in chromatic aberration when the second lens group G21 is moved during focusing.

According to various embodiments, at least one optical device OD1 may be provided between the seventh lens L71 and the image plane IMG. The optical device OD1 may include at least one from among, for example, a low-pass filter, an infrared (IR)-cut filter, and a cover glass. For example, when an IR-cut filter is provided as the optical device OD1, visible rays may be transmitted and IR rays may be blocked that the IR rays may not be transmitted to the image plane IMG. However, the optical lens assembly 100-1 may not include the optical device OD1. According to various embodiments, at least one of lenses included in the first lens group G11 may be an aspherical lens. For example, each of the first lens L11, the second lens L21, the third lens L31, the fourth lens L41, and the fifth lens L51 may be an aspherical lens. According to various embodiments, at least one of lenses included in the second lens group G21 may be an aspherical lens. For example, each of the sixth lens L61 and the seventh lens L71 may be an aspherical lens.

Figure 3:
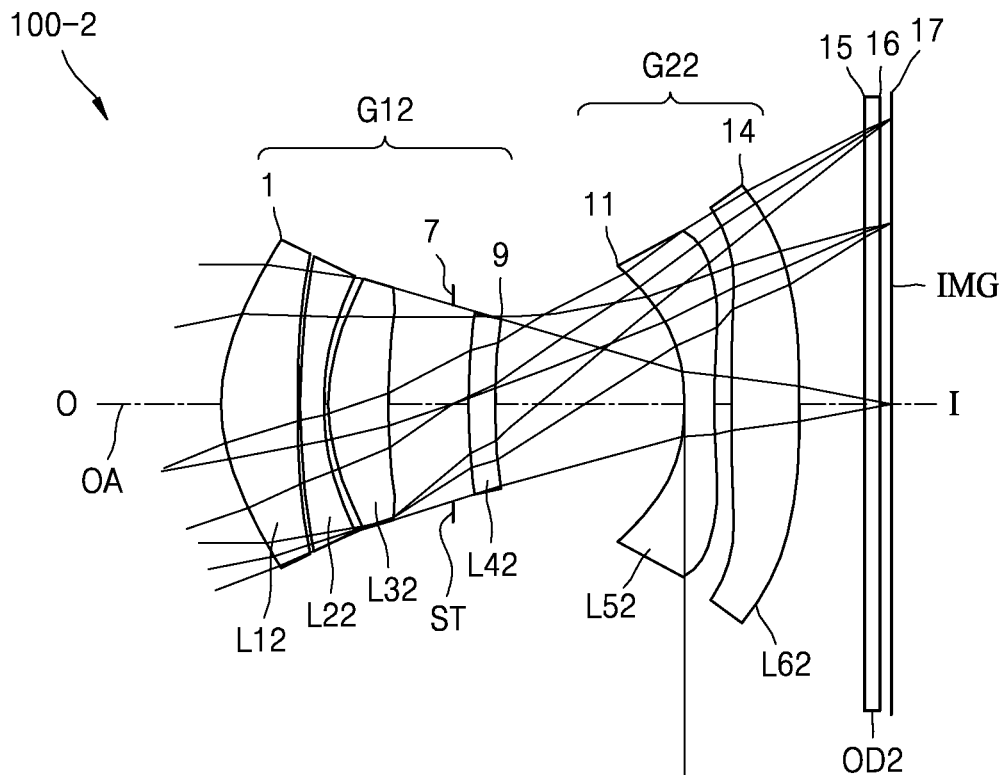
FIG. 3 illustrates an optical lens assembly of a second embodiment of the present disclosure.
Figure 3:
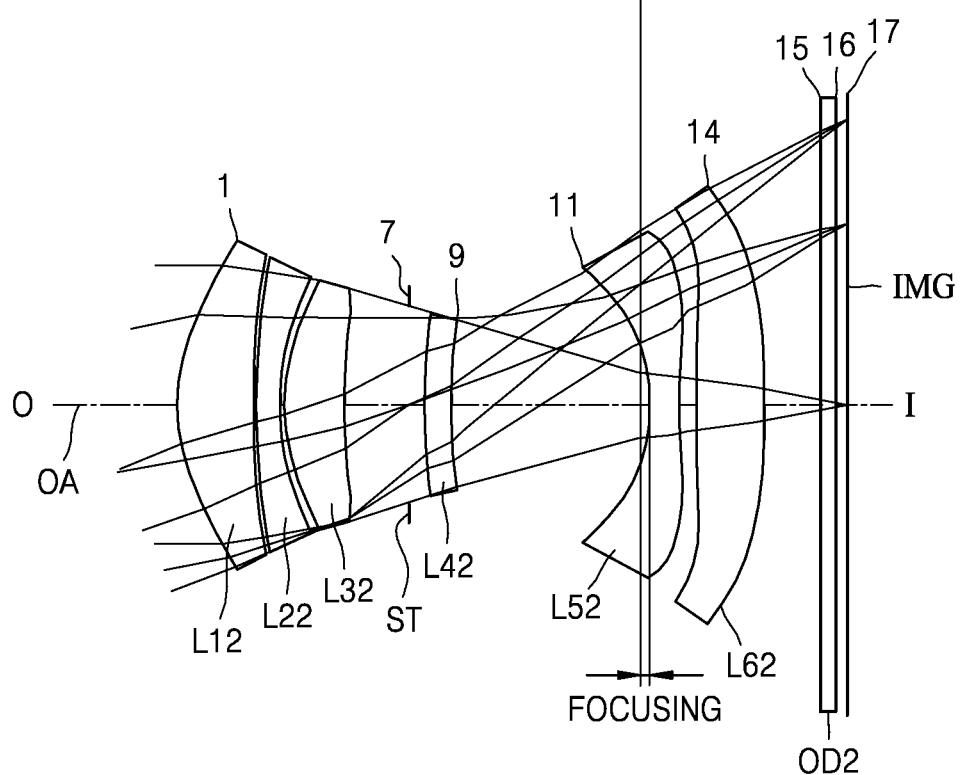

FIG. 3 illustrates an optical lens assembly 100-2 of a second embodiment of the present disclosure. In the present embodiment, the same or similar elements as those in the above embodiment are not described.

According to various embodiments, the optical lens assembly 100-2 may have a field of view of, for example, about 50°. The optical lens assembly 100-2 may include a first lens group G12 having positive refractive power and a second lens group G22. The first lens group G12 may include, for example, a first lens L12 having positive refractive power, a second lens L22 having negative refractive power, a third lens L32 having positive refractive power, and a fourth lens L42 having positive refractive power. The second lens group G22 may include a fifth lens L52 having negative refractive power and a sixth lens L62 having positive refractive power. The first lens L12 may have, for example, a meniscus shape convex toward the object side O. The second lens L22 may have, for example, a meniscus shape convex toward the object side O. The third lens L32 may have, for example, a meniscus shape convex toward the object side O. The fourth lens L42 may have, for example, a meniscus shape convex toward the object side O. The fifth lens L52 may have, for example, a biconcave shape in a paraxial region. The paraxial region may refer to a region that is a region near the optical axis OA within a predetermined radius from the optical axis OA. The sixth lens L62 may have, for example, a biconvex shape in the paraxial region. The sixth lens L62 may have, for example, at least one inflection point on the object-side surface or the image-side surface. According to various embodiments, at least one optical device OD2 may be provided between the sixth lens L62 and the image plane IMG.

Figure 5:
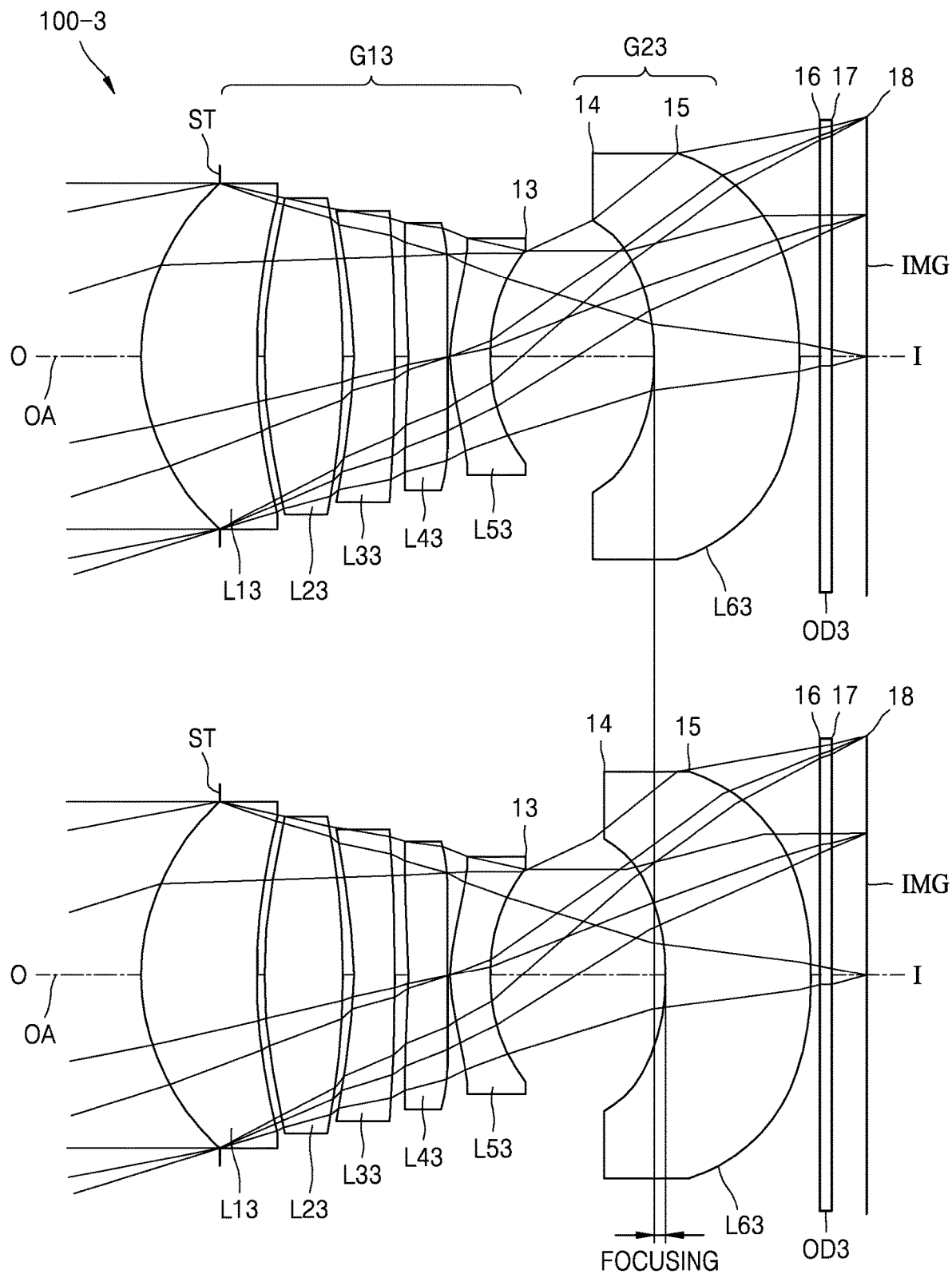
FIG. 5 illustrates an optical lens assembly of a third embodiment of the present disclosure.

FIG. 5 illustrates an optical lens assembly 100-3 of a third embodiment of the present disclosure. The optical lens assembly 100-3 according to the third embodiment may have a field of view of, for example, about 35°. According to various embodiments, the optical lens assembly 100-3 may include a first lens group G13 having positive refractive power and a second lens group G23 having negative refractive power. The first lens group G13 may include a first lens L13 having positive refractive power, a second lens L23 having positive refractive power, a third lens L33 having negative refractive power, a fourth lens L43 having negative refractive power, and a fifth lens L53 having negative refractive power. The stop ST may be provided on the object-side surface of the first lens L13. The second lens group G23 may include one lens. For example, the second lens group G23 may include a sixth lens L63 having negative refractive power. The optical lens assembly 100-3 may include a lens having strong positive refractive power toward the object side O in order to have a large aperture, e.g. an aperture ratio of 1:2.2. For example, spherical aberration may be effectively suppressed by sequentially arranging two lenses having positive refractive powers from the object side O. The first lens L13 may have a meniscus shape convex toward the object side O. The second lens L23 may be a biconvex lens. The third lens L33 may have a meniscus shape convex toward the image side I. The fourth lens L43 may have a biconcave shape in the paraxial region. In an image-side surface of the fourth lens L43, a portion in the paraxial region may have a concave shape and a peripheral lens portion may have a convex shape. The fifth lens L53 may have a meniscus shape convex toward the object side O. The sixth lens L63 may have a meniscus shape convex toward the image side I.

According to various embodiments, at least one optical device OD3 may be provided between the sixth lens L63 and the image plane IMG.

Figure 7:
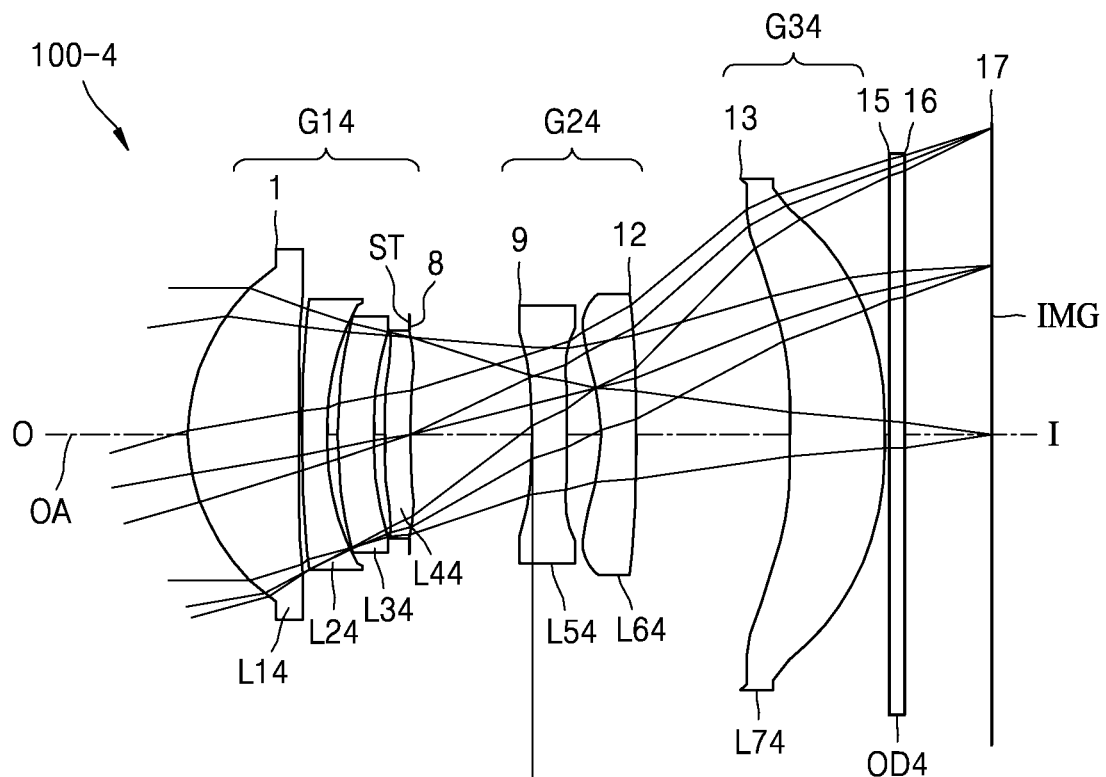
FIG. 7 illustrates an optical lens assembly of a fourth embodiment of the present disclosure.
Figure 7:
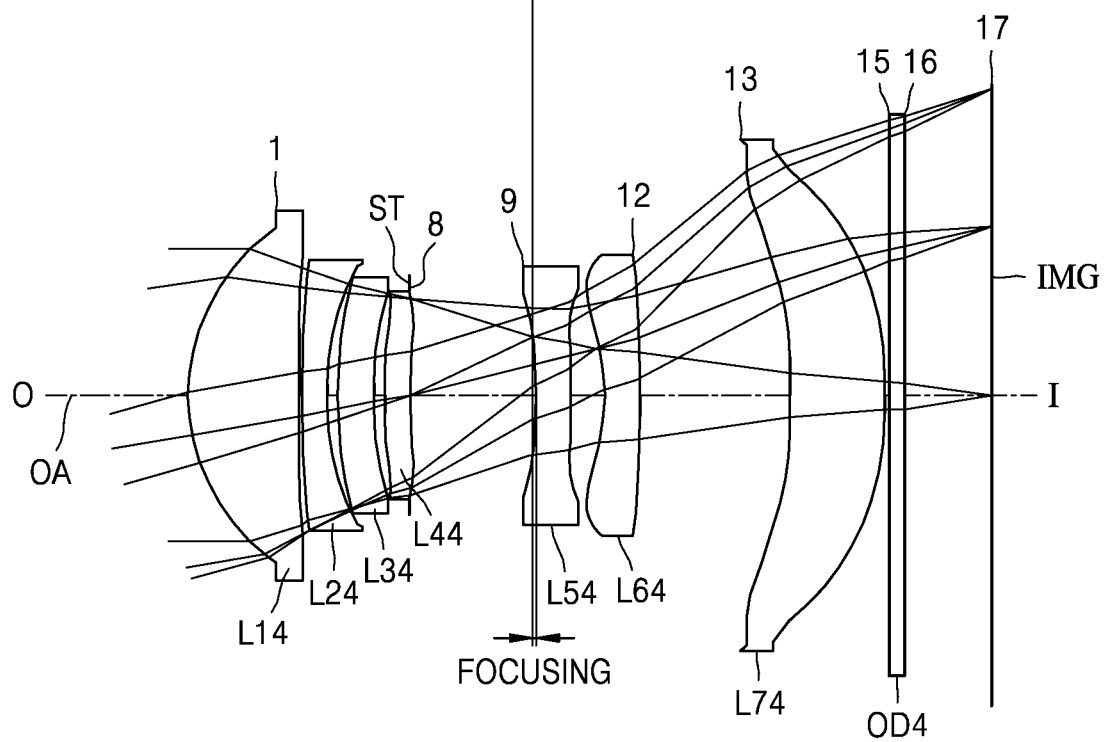

FIG. 7 illustrates an optical lens assembly 100-4 of a fourth embodiment of the present disclosure. The optical lens assembly 100-4 according to the fourth embodiment may have a field of view of about 32°. The optical lens assembly 100-4 may include a first lens group G14 having positive refractive power and a second lens group G24 having negative refractive power. The first lens group G14 may include a first lens L14 having positive refractive power, a second lens L24 having negative refractive power, a third lens L34 having positive refractive power, and a fourth lens L44 having negative refractive power. Each of the first lens L14, the second lens L24, the third lens L34, and the fourth lens L44 may have a meniscus shape convex toward the object side O.

The stop ST may be provided on the image-side surface of the fourth lens L44.

The second lens group G24 may include a fifth lens L54 having negative refractive power and a sixth lens L64 having negative refractive power. For example, the fifth lens L54 may have a meniscus shape concave from the object side O. The sixth lens L64 may have a meniscus shape concave from the object side O. A third lens group G34 including at least one lens may be further provided between the second lens group 24 and the image side I. The third lens group G34 may have positive or negative refractive power. For example, the third lens group G34 may include a seventh lens L74 having negative refractive power. The seventh lens L74 may have a meniscus shape concave from the object side O.

The second lens group G24 may perform focusing as the distance between the object and the optical lens assembly 100-4 changes.

According to various embodiments, at least one optical device OD4 may be provided between the seventh lens L74 and the image plane IMG.

Figure 9:
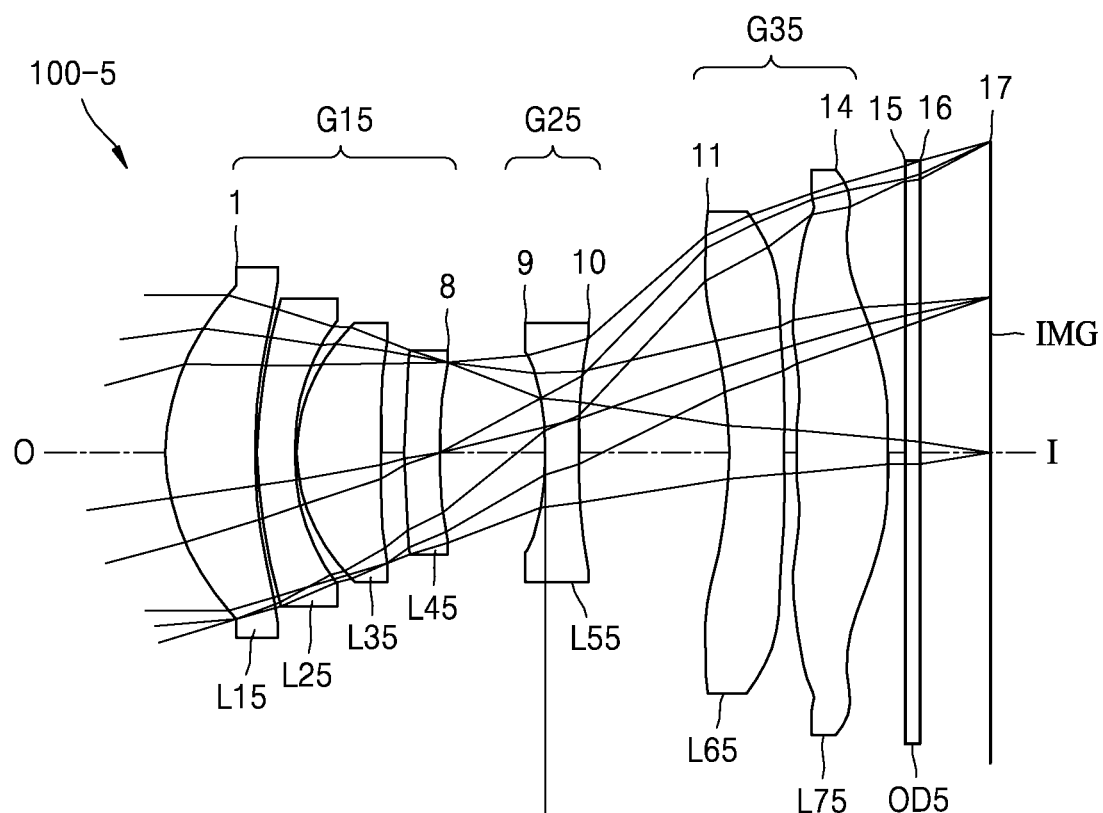
FIG. 9 illustrates an optical lens assembly of a fifth embodiment of the present disclosure.
Figure 9:
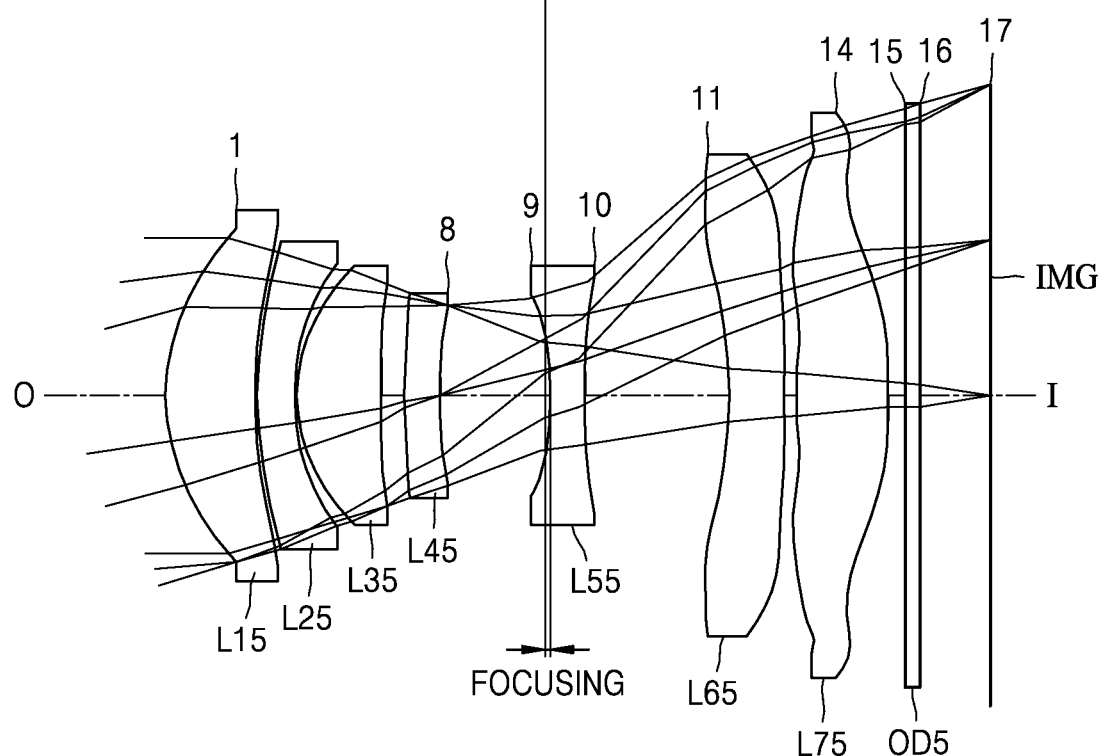

FIG. 9 illustrates an optical lens assembly 100-5 of a fifth embodiment of the present disclosure. The optical lens assembly 100-5 according to the fifth embodiment may have a field of view of 32°. The optical lens assembly 100-5 may include a first lens group G15 having positive refractive power and a second lens group G25 having negative refractive power. The first lens group G15 may include a first lens L15 having positive refractive power, a second lens L25 having negative refractive power, a third lens L35 having positive refractive power, and a fourth lens L45 having negative refractive power. Each of the first lens L15, the second lens L25, the third lens L35, and the fourth lens L45 may have a meniscus shape convex toward the object side O.

The second lens group G25 may include a fifth lens L55 having negative refractive power. The fifth lens L55 may be a biconcave lens. A third lens group G35 including at least one lens may be further provided between the second lens group G25 and the image side I. The third lens group G35 may have negative refractive power.

For example, the third lens group G35 may include a sixth lens L65 having positive refractive power and a seventh lens L75 having positive refractive power.

The second lens group G25 may perform focusing as the distance between the object and the optical lens assembly 100-5 changes.

According to various embodiments, at least one optical device OD5 may be provided between the seventh lens L75 and the image plane IMG.

The optical lens assembly according to various embodiments may satisfy the following formulae. The following formulae will be described with reference to the optical lens assembly 100-1 according to the first embodiment. However, the following formulae may also be similarly applied to other embodiments.

$$-3 < \log\frac{|f_i - f_f|}{f_i} < -1 \quad (1)$$

where $f_i$ denotes the total focal length of the optical lens assembly when focusing at infinite distance, and $f_f$ denotes the total focal length of the optical lens assembly when focusing at a position where the optical lens assembly has a magnification of 0.01.

Formula 1 defines a change in the focal length of the entire optical lens assembly when the distance between the object and the optical lens assembly changes. When the $$\left(\log\frac{|f_i - f_f|}{f_i}\right)$$

value is greater than the upper limit of Formula 1, the focal length is greatly changed and it is difficult to maintain a field of view. When the $$\left(\log\frac{|f_i - f_f|}{f_i}\right)$$

value is less than the lower limit, it may be impossible to correct movement of the image plane IMG for the distance between the object and the optical lens assembly.

The optical lens assembly according to various embodiments may satisfy the following formula.

$$5 < \frac{TTL}{\tan\theta} < 40 \quad (2)$$

where TTL denotes the total length of the optical lens assembly, and θ denotes the half field of view angle of the optical lens assembly when focusing at infinite distance.

Formula 2 defines the size of the optical lens assembly according to the field of view. When (TTL/Tan θ) is greater than the upper limit of Formula 2, it may be difficult to realize a small optical system for a given field of view. When (TTL/Tan θ) is less than the lower limit of Formula 2, miniaturization may be achieved. However, when (TTL/Tan θ) is less than the lower limit of Formula 2, each lens may be too thin, and it may be difficult to manufacture the lenses. Also, when the size of the lens assembly is reduced, the field of incidence on the image plane IMG may be increased, thereby making it difficult to secure a sufficient amount of ambient light.

The optical lens assembly according to various embodiments may satisfy the following formulae.

$$0 < \left|\frac{TAS}{\theta}\right| < 0.03 \quad (3)$$

$$0.3 < |(1 - m_f^2) \cdot m_r^2| < 5.0 \quad (4)$$

where TAS denotes the Seidel tertiary astigmatism of the second lens group, $m_f$ denotes the magnification of the second lens group, which is a focusing lens group, and $m_r$ denotes the combined magnification of the lens group located next to the second lens group, i.e. between the second lens group and the image plane IMG.

Formula 3 limits the astigmatism of the focusing lens group. As the astigmatism of a peripheral lens portion is changed during focusing as the distance between the object and the optical lens assembly changes, optical performance depending on the distance between the object and the optical lens assembly may be changed. When $$\left|\frac{TAS}{\theta}\right|$$

exceeds the range of formula 3, the optical performance depending on the distance between the object and the optical lens assembly may be greatly changed.

When there is no lens group next to the second lens group in Formula 4, $m_r=1$. Formula 4 defines the image plane movement sensitivity of the focusing lens group. The amount of movement of the focusing lens group according to the change in the distance between the object and the optical lens assembly may be determined from the image plane movement sensitivity. When $(|(1-m_f^2) \cdot m_r^2|)$ is less than the lower limit of Formula 4, the interval between the first lens group and the focusing lens group (e.g. the second lens group) or the interval between the first lens group and the lens group located next to the focusing lens group or the image plane IMG may be greatly increased, thereby increasing the total length of the optical lens assembly. When $|(1-m_f^2) \cdot m_r^2|$ greater than the upper limit of Formula 4, the amount of movement of the focusing lens group is much less than the amount of movement of the image plane IMG, thereby requiring excessive lens position control for focusing and increasing costs.

The optical lens assembly according to various embodiments may satisfy the following formulae.

$$1.0 < \frac{TTL}{Y_{IM}} < 4.0 \tag{5}$$

$$0.7 < \frac{TTL}{f_1} < 1.0 \tag{6}$$

where $f_i$ denotes the total focal length of the optical lens assembly when focusing at infinite distance, and $Y_{IM}$ denotes the image height.

Formulae 5 and 6 may be conditions for reducing the size of the optical lens assembly. When $$\left(\frac{TTL}{Y_{IM}}\right)$$

exceeds the range of Formula 5, it may be difficult to have a compact design for the optical lens assembly while still having the desired field of view and focal length.

The optical lens assembly according to various embodiments may satisfy the following formula.

$$0.1 < \frac{R_1}{f_i} < 0.5 \tag{7}$$

where $R_1$ denotes the radius of curvature of an object-side surface of the first lens.

Formula 7 defines a ratio between the focal length and the radius of curvature of an object-side surface of the first lens L11 located closest to the object side O.

The object-side surface of the first lens may have strong refractive power in order to have a large aperture. When $$\left(\frac{R_1}{f_i}\right)$$

is greater than the upper limit of Formula 7, it may be difficult to have a large aperture, and when $$\left(\frac{R_1}{f_i}\right)$$

is less than the lower limit, the refractive power may be greatly increased, thereby making it difficult to correct spherical aberration.

The optical lens assembly according to various embodiments may satisfy the following formula:

$$-2.0 < f_w/f_i < 0 \tag{8}$$

where $f_i$ denotes the total focal length of the optical lens assembly when focusing at an infinite distance, and $f_w$ denotes the focal length of the second lens group.

When $(f_w/f_i)$ is greater than the upper limit of Formula 8, it may be difficult to correct chromatic aberration and Petzval aberration. Also, it may be difficult to correct spherical aberration during autofocusing of the second lens group. When $(f_w/f_i)$ is less than the lower limit of Formula 8, the refractive power of the second lens group is reduced and it is difficult to maintain a compact total length for the optical lens assembly. Also, when $(f_w/f_i)$ is less than the lower limit of Formula 8, during autofocusing of the second lens group, the movement distance for the autofocusing may be increased and the total length may be increased, thereby making it difficult to manufacture the mechanism for the autofocusing.

The optical lens assembly according to various embodiments may have compact size, improved telephoto performance, and high resolution. The optical lens assembly may be mounted on, for example, mobile terminals, and may be applied to digital cameras, camcorders, PCs, or other electronic products.

An aspherical surface used in the optical lens assembly according to various embodiments may be defined as follows.

An aspherical shape may be represented as the following formula with the positive traveling direction of rays as the positive direction. The following formula uses a coordinate system where the optical axis direction is the x-axis and the direction perpendicular to the optical axis direction is the y-axis. "x" denotes a distance in the optical axis direction from a vertex of a lens, "y" denotes a distance in the direction perpendicular to the optical axis, "K" denotes a conic constant, "A, B, C, D, . . . " denote aspherical coefficients, and "c" denotes a reciprocal number (1/R) of a radius of curvature at the vertex of the lens.

$$x = \frac{cy^2}{1 + \sqrt{1-(K+1)c^2y^2}} + Ay^4 + By^6 + Cy^8 + Dy^{10} + \ldots \tag{9}$$

According to the present disclosure, an optical lens assembly may be implemented by various embodiments according to various designs as follows.

In each embodiment, lens surface numbers 1, 2, 3, . . . , and n (where "n" is a natural integer) are added sequentially from the object side O to the image side I. The lens surface numbers in the drawings are added only to an object-side surface of a lens that is a frontmost lens of each lens group and an image-side surface of a lens that is a rearmost lens of the lens group for convenience of explanation. "$f_i$" denotes the total focal length at an infinite object distance of the optical lens assembly, "EFL" denotes the focal length of each lens, "Fno" denotes the F number, "HFOV" denotes the half field of view angle, "R" denotes the radius of curvature, "Dn" denotes the thickness of the lens or an air gap between lenses, "nd" denotes the refractive index, "vd" denotes the Abbe number, and "H-Aper" denotes the radius of the lens. Also, "ST" denotes the stop, "obj" denotes the object, and "*" denotes an aspherical surface.

First Embodiment

FIG. 1 illustrates the optical lens assembly 100-1 according to the first embodiment. Table 1 shows, for example, design data of the first embodiment. e-line is 546.1 nm.

TABLE 1

| Lens surface | R | Dn | H-Aper | EFL (e-line) | nd | vd |
|---|---|---|---|---|---|---|
| obj | infinity | D0 | | | | |
| 1* | 2.055 | 0.824 | 1.59 | 4.173 | 1.5441 | 56.09 |
| 2* | 17.831 | 0.015 | 1.51 | | | |
| 3* | 4.314 | 0.21 | 1.45 | −5.8399 | 1.63492 | 23.89 |
| 4* | 1.966 | 0.03 | 1.3 | | | |
| 5* | 2.22 | 0.623 | 1.29 | 6.121 | 1.5311 | 55.91 |
| 6* | 6.259 | 0.265 | 1.2 | | | |
| 7* | 13.396 | 0.225 | 1.08 | −101.633 | 1.65037 | 21.52 |
| 8* | 11.085 | 0.191 | 1 | | | |
| 9(ST) | infinity | 0.063 | 0.9 | | | |
| 10* | −13.785 | 0.214 | 0.88 | −6.1853 | 1.5441 | 56.09 |
| 11* | 4.503 | 0.45 | 0.8 | | | |
| 12 | infinity | D1 | 0.7 | | | |
| 13* | −2.766 | 0.265 | 1.13 | −6.0156 | 1.5441 | 56.09 |
| 14* | −18.016 | 0.923 | 1.45 | | | |
| 15* | −8.714 | 0.9 | 2.38 | 14.0188 | 1.61442 | 25.95 |
| 16* | −4.523 | D2 | 2.44 | | | |
| 17 | infinity | 0.11 | 2.71 | | 1.5168 | 64.2 |
| 18 | infinity | D3 | 2.74 | | | |
| IMG | infinity | D4 | | | | |

Table 2 shows aspherical coefficients in the first embodiment.

TABLE 2

| | K | A | B | C | D | E |
|---|---|---|---|---|---|---|
| 1 | −2.57E−01 | 1.41E−04 | −3.33E−06 | 5.66E−04 | −2.25E−04 | |
| 2 | 8.00E+01 | 1.76E−02 | −1.32E−03 | −1.02E−03 | 8.00E−06 | 2.41E−05 |
| 3 | 0.00E+00 | −2.46E−03 | 2.53E−03 | 1.99E−04 | −3.64E−04 | −7.03E−05 |
| 4 | 0.00E+00 | −3.40E−03 | −4.91E−04 | 1.91E−03 | 1.13E−03 | −1.67E−03 |
| 5 | 0.00E+00 | 2.28E−03 | 1.65E−03 | 2.74E−03 | −2.61E−03 | 4.68E−04 |
| 6 | −1.00E+00 | −1.93E−02 | 7.78E−03 | −5.77E−03 | 6.50E−04 | 1.74E−04 |
| 7 | 0.00E+00 | −3.05E−02 | −5.55E−03 | 8.72E−03 | 7.55E−03 | −3.55E−03 |
| 8 | 0.00E+00 | −3.46E−02 | −1.21E−02 | 2.05E−03 | 2.53E−02 | −6.23E−03 |
| 10 | 0.00E+00 | 3.67E−02 | −1.06E−01 | 2.33E−02 | −1.57E−03 | 7.08E−02 |
| 11 | 0.00E+00 | 9.02E−02 | 3.92E−02 | −5.29E−01 | 1.27E+00 | −1.40E+00 |
| 13 | 0.00E+00 | −4.59E−02 | −1.37E−02 | −4.96E−02 | 3.24E−02 | 8.68E−03 |
| 14 | 0.00E+00 | −1.21E−02 | −1.23E−02 | −8.71E−03 | 6.02E−03 | 4.89E−04 |
| 15 | 0.00E+00 | 9.24E−03 | 4.05E−03 | −8.39E−04 | −1.22E−04 | 5.56E−05 |
| 16 | 0.00E+00 | −3.23E−02 | 1.53E−02 | −3.40E−03 | 3.78E−04 | 2.49E−05 |

Table 3 shows, in the optical lens assembly 100-1 according to the first embodiment, variable distances D0, D1, D2, D3, and D4, the focal length $f_i$, the magnification MAG, the F number, the half field of view angle HFOV, and the total length TTL for an infinite object distance Pos1 and an object distance Pos2 having a magnification MAG of 0.01. FIG. 1 illustrates the focusing operation at the infinite object distance and at the object distance having magnification MAG of 0.01. TTL denotes the distance along the optical axis between the object-side surface of the lens closest to the object side O and the image plane IMG. "in air" denotes the distance between the image-side surface of the lens closest to the image side I of the optical lens assembly and the image plane IMG (e.g., imaging device) when there is no optical device. That is, "in air" may denote the back focal length in air.

TABLE 3

| | Pos1 | Pos2 |
|---|---|---|
| D0 | infinity | 904.6626 |
| D1 | 1.1031 | 1.20416 |
| D2 | 0.58122 | 0.48016 |
| D3 | 0.1 | 0.1 |
| D4 | −0.022 | −0.022 |
| in air | 0.732 | 0.631 |
| fi | 9 | — |
| MAG | — | 0.01 |
| HFOV | 16.801 | 16.664 |
| Fno | 2.849 | 2.872 |
| TTL | 7.07 | 7.07 |

Figure 2:
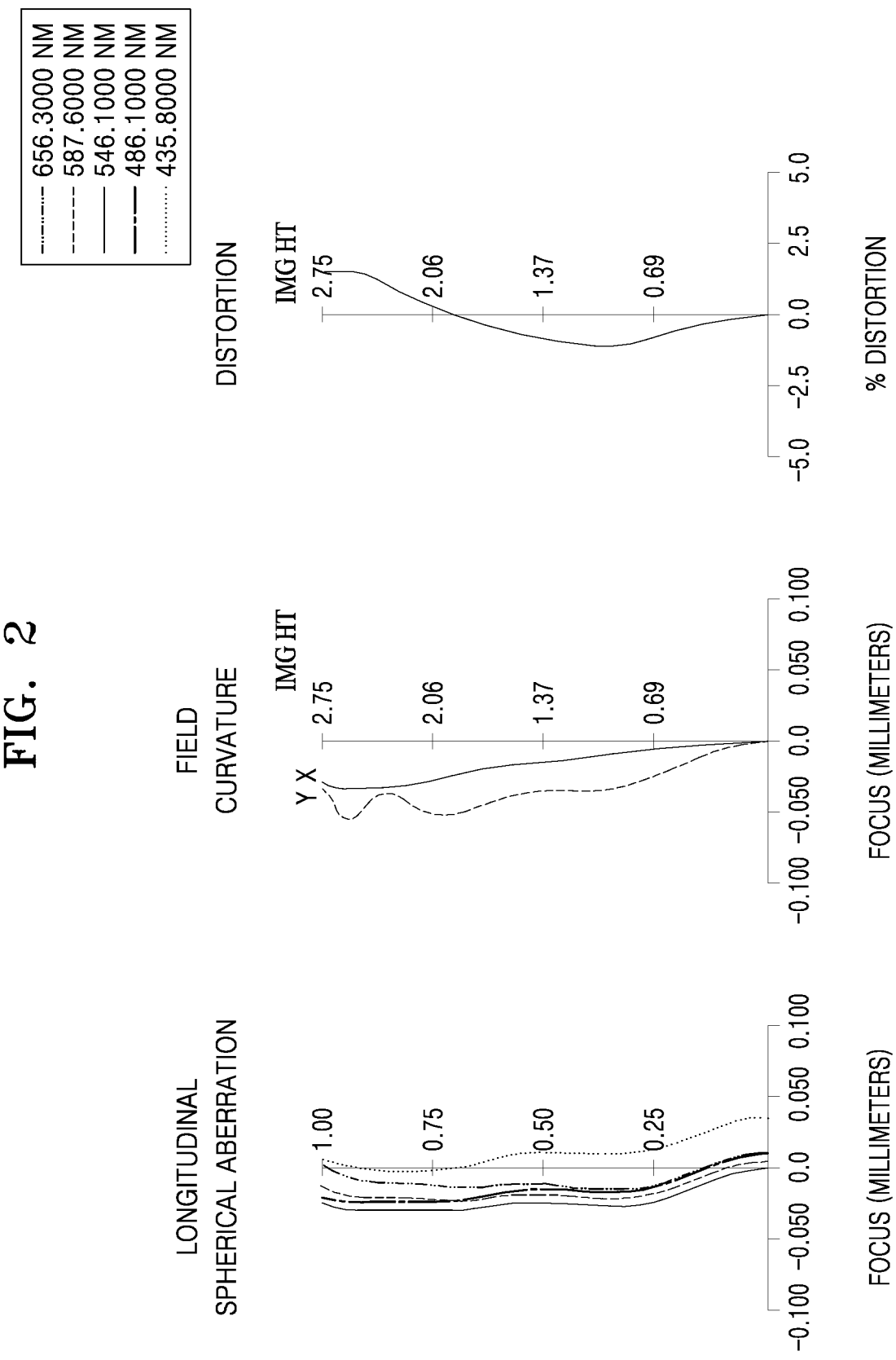
FIG. 2 illustrates aberration diagrams of the optical lens assembly of the first embodiment of the present disclosure.

FIG. 2 illustrates longitudinal spherical aberration, astigmatic field curvature, and distortion of the optical lens assembly 100-1 according to the first embodiment. The longitudinal spherical aberration is measured at wavelengths of 656.3000 nanometers (nm), 587.6000 nm, 546.1000 nm, 486.1000 nm, and 435.8000 nm, and the astigmatic field curvature includes a tangential field curvature T and a sagittal field curvature S. The astigmatic field curvature is measured at a wavelength of 587.6000 nm, and the distortion is measured at a wavelength of 587.6000 nm.

Second Embodiment

FIG. 3 illustrates the optical lens assembly 100-2 according to the second embodiment. Table 4 shows, for example, design data of the second embodiment.

TABLE 4

| Lens surface | R | Dn | H-Aper | EFL (e-line) | nd | vd |
|---|---|---|---|---|---|---|
| obj | infinity | D0 | | | | |
| 1* | 2.177 | 0.627 | 1.45 | 4.597 | 1.5441 | 56.09 |
| 2* | 14.658 | 0.015 | 1.32 | | | |
| 3* | 6.742 | 0.21 | 1.3 | -6.7458 | 1.65037 | 21.52 |
| 4* | 2.642 | 0.03 | 1.14 | | | |
| 5* | 2.22 | 0.49 | 1.1 | 7.4974 | 1.5311 | 55.91 |
| 6* | 4.607 | 0.559 | 1.05 | | | |
| 7(ST) | infinity | 0.118 | 0.85 | | | |
| 8* | 5.722 | 0.214 | 0.82 | 49.6675 | 1.5441 | 56.09 |
| 9* | 7.154 | 0.45 | 0.78 | | | |
| 10 | infinity | D1 | 0.79 | | | |
| 11* | -2.388 | 0.265 | 1.22 | -3.0372 | 1.5441 | 56.09 |
| 12* | 5.657 | 0.139 | 1.54 | | | |
| 13* | 9.173 | 0.564 | 1.73 | 10.8659 | 1.61442 | 25.95 |
| 14* | -24.768 | D2 | 1.94 | | | |
| 15 | infinity | 0.11 | 2.65 | | 1.5168 | 64.2 |
| 16 | infinity | D3 | | | | |
| IMG | infinity | D4 | | | | |

Table 5 shows aspherical coefficients in the second embodiment.

TABLE 5

| | K | A | B | C | D | E |
|---|---|---|---|---|---|---|
| 1 | -3.09E-01 | -1.51E-03 | -8.55E-04 | 5.28E-04 | -8.30E-04 | |
| 2 | 8.00E+01 | 1.68E-02 | -2.55E-03 | -1.23E-03 | 1.01E-04 | -1.88E-06 |
| 3 | 0.00E+00 | -4.69E-03 | 1.61E-03 | 2.79E-04 | -3.42E-04 | -8.89E-05 |
| 4 | 0.00E+00 | -3.42E-03 | 5.94E-05 | -4.55E-04 | 1.06E-03 | -6.77E-04 |
| 5 | 0.00E+00 | 1.66E-02 | -6.93E-03 | 1.32E-03 | -3.47E-03 | 1.42E-03 |
| 6 | -1.00E+00 | -4.18E-03 | -3.94E-03 | -9.05E-03 | 3.01E-03 | 8.24E-04 |
| 8 | 0.00E+00 | 1.38E-02 | -3.69E-02 | 2.24E-03 | -1.82E-02 | 7.10E-02 |
| 9 | 0.00E+00 | 5.97E-02 | 1.05E-01 | -5.23E-01 | 1.24E+00 | -1.40E+00 |
| 11 | 0.00E+00 | -1.14E-01 | 3.01E-02 | -2.12E-02 | 4.07E-03 | 7.79E-03 |
| 12 | 0.00E+00 | -8.14E-02 | 1.58E-02 | -9.57E-03 | 5.06E-04 | 1.56E-04 |
| 13 | 0.00E+00 | -2.44E-02 | 1.09E-03 | -2.20E-03 | -4.71E-04 | 1.01E-04 |
| 14 | 0 | -6.16E-02 | 2.27E-02 | -5.24E-03 | 2.95E-04 | 9.31E-05 |

Table 6 shows, in the optical lens assembly 100-2 according to the second embodiment, the variable distances D0, D1, D2, D3, and D4, the focal length the magnification MAG, the F number, the half field of view HFOV, and the total length TTL for the infinite object distance Pos1 and the object distance Pos2 having the magnification MAG of 0.01.

TABLE 6

| | Pos1 | Pos2 |
|---|---|---|
| D0 | infinity | 596.87913 |
| D1 | 1.11381 | 1.19108 |
| D2 | 0.56678 | 0.48951 |
| D3 | 0.1 | 0.1 |
| D4 | -0.022 | -0.022 |
| in air | 0.717 | 0.64 |
| fi | 6 | — |
| MAG | — | 0.01 |
| HFOV | 24.973 | 22.521 |
| Fno | 2.437 | 2.431 |
| TTL | 5.5500 | 5.55 |

Figure 4:
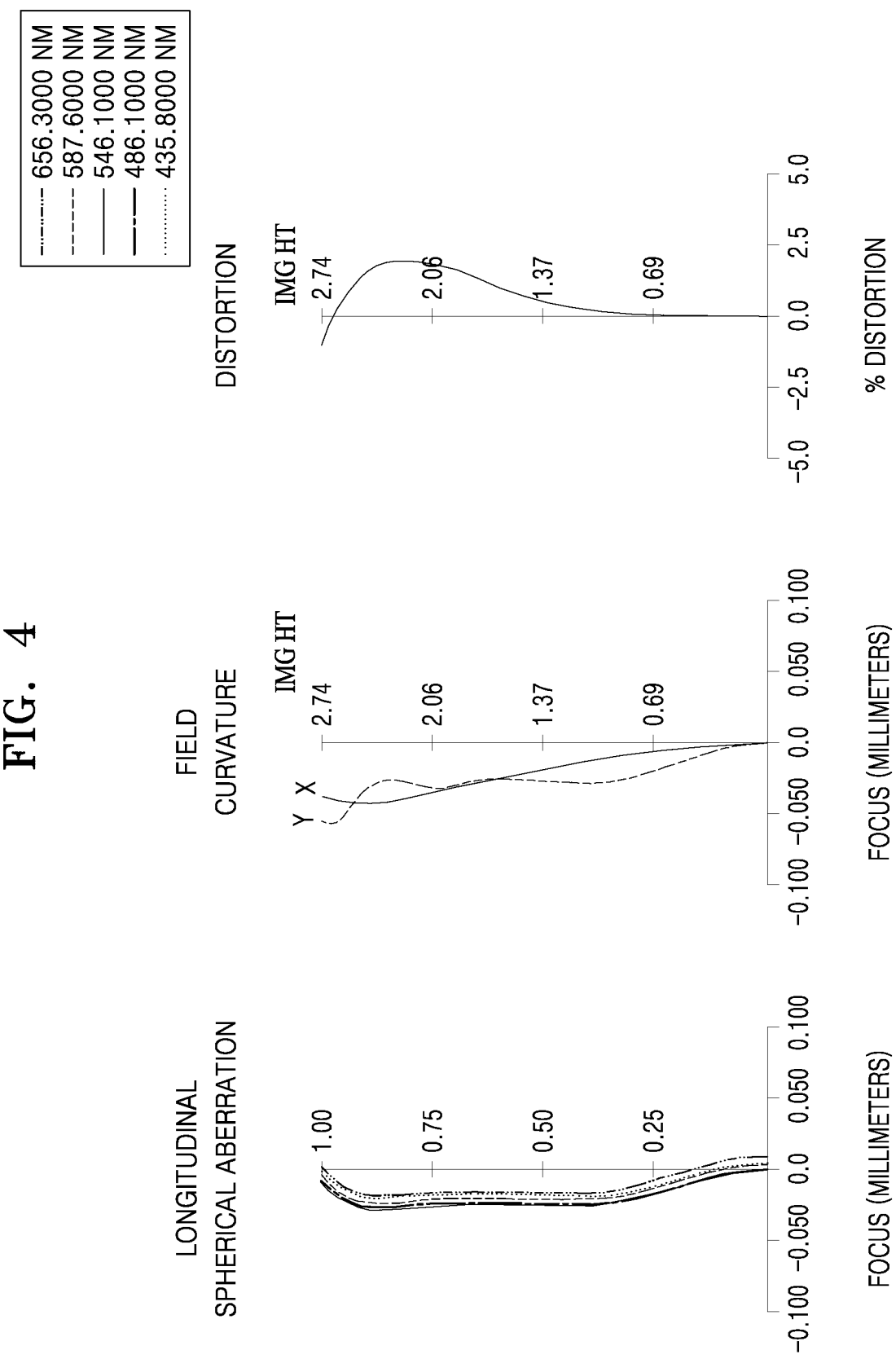
FIG. 4 illustrates aberration diagrams of the optical lens assembly of the second embodiment of the present disclosure.

FIG. 4 illustrates longitudinal spherical aberration, astigmatic field curvature, and distortion of the optical lens assembly 100-2 according to the second embodiment.

Third Embodiment

FIG. 5 illustrates the optical lens assembly 100-3 according to the third embodiment. Table 7 shows, for example, design data of the third embodiment.

TABLE 7

| Lens surface | R | Dn | H-Aper | EFL (e-line) | nd |
|---|---|---|---|---|---|
| obj | infinity | D0 | | | |
| 1 | infinity | 0 | | | |
| 2 | infinity | 0 | | | |
| 3(ST)* | 2.66 | 1.313 | | 7.5946 | 1.5312 | 56.5 |
| 4* | 6.412 | 0.092 | | | |

TABLE 7-continued

| Lens surface | R | Dn | H-Aper | EFL (e-line) | nd |
|---|---|---|---|---|---|
| 5* | 6.267 | 0.882 | 6.4945 | 1.5312 | 56.5 |
| 6* | -7.368 | 0.138 | | | |
| 7* | -5.267 | 0.459 | -11.2321 | 1.65055 | 21.53 |
| 8* | -18.982 | 0.138 | | | |
| 9* | -14.809 | 0.458 | -14.2642 | 1.63448 | 23.14 |
| 10* | 24.181 | -0.01 | | | |
| 11 | infinity | 0.036 | | | |
| 12* | 2.538 | 0.459 | -38.61 | 1.65055 | 21.53 |
| 13* | 2.142 | D1 | | | |
| 14* | -2.921 | 1.623 | -9.9483 | 1.65055 | 21.53 |
| 15* | -6.441 | D2 | | | |
| 16 | infinity | 0.11 | 1.5168 | 64.2 | |
| 17 | infinity | D3 | | | |
| IMG | infinity | D4 | | | |

In Table 7, number 11 denotes a ray cut member.

Table 8 shows aspherical coefficients in the third embodiment.

TABLE 8

| | K | A | B | C | D | E |
|---|---|---|---|---|---|---|
| 3 | −9.91E−02 | −6.66E−04 | −5.73E−05 | 0.00E+00 | 0.00E+00 | |
| 4 | −3.25E+00 | 4.04E−04 | −1.15E−04 | 0.00E+00 | 0.00E+00 | |
| 5 | 7.29E−01 | −3.59E−03 | −5.55E−04 | 0.00E+00 | 0.00E+00 | |
| 6 | −8.89E+00 | 4.79E−03 | −6.29E−04 | 0.00E+00 | 0.00E+00 | |
| 7 | −1.00E+01 | 3.33E−03 | −2.91E−04 | 0.00E+00 | 0.00E+00 | |
| 8 | −9.71E+00 | −8.19E−04 | 7.16E−04 | 0.00E+00 | 0.00E+00 | |
| 9 | 1.00E+01 | 1.40E−02 | −2.55E−03 | 0.00E+00 | 0.00E+00 | |
| 10 | −1.00E+01 | −2.06E−02 | −6.52E−05 | 0.00E+00 | 0.00E+00 | |
| 12 | −1.61E+00 | −1.69E−02 | −2.60E−02 | 5.37E−03 | 0.00E+00 | |
| 13 | 7.63E−01 | 1.90E−02 | −4.04E−02 | 9.22E−03 | 0.00E+00 | |
| 14 | −5.42E+00 | −5.11E−02 | 1.12E−02 | −5.04E−03 | 0.00E+00 | |
| 15 | 5.95718 | −3.32E−02 | 5.53E−03 | −6.44E−04 | 0.00E+00 | |

Table 9 shows, in the optical lens assembly 100-3 according to the third embodiment, the variable distances D0, D1, D2, D3, and D4, the focal length $f_i$, the magnification MAG, the F number, the half field of view HFOV, and the total length TTL for the infinite object distance Pos1 and the object distance Pos2 having the magnification MAG of 0.01.

TABLE 9

| | Pos1 | Pos2 |
|---|---|---|
| D0 | infinity | 871.1905 |
| D1 | 1.84079 | 1.97278 |
| D2 | 0.29 | 0.15801 |
| D3 | 0.37942 | 0.37942 |
| D4 | 0 | 0 |
| in air | 0.742 | 0.61 |
| fi | 8.7114 | — |
| MAG | — | 0.01 |
| HFOV | 17.435 | 17.242 |
| Fno | 2.178 | 2.18 |
| TTL | 8.207 | 8.207 |

Figure 6:
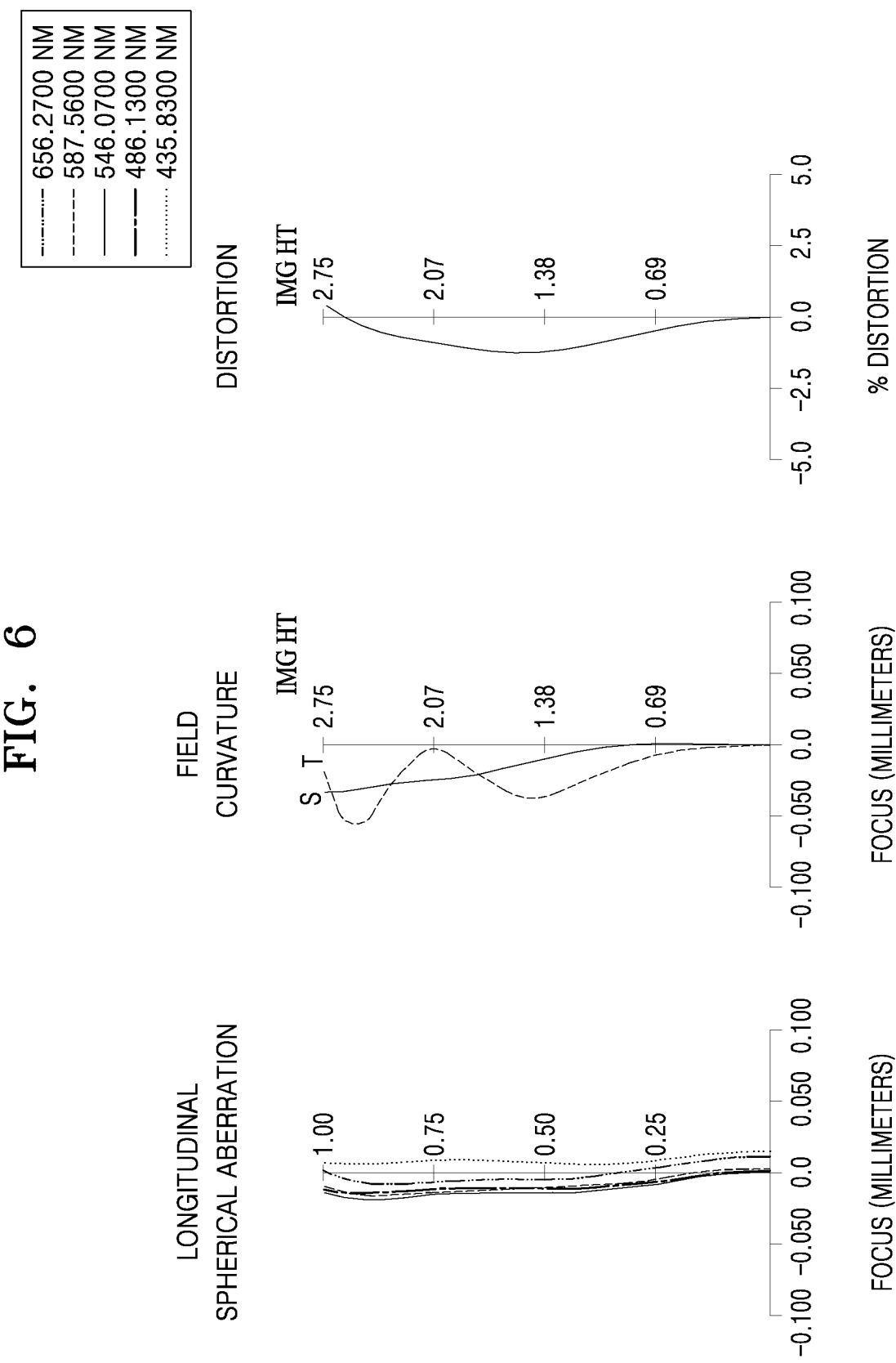
FIG. 6 illustrates aberration diagrams of the optical lens assembly of the third embodiment of the present disclosure.

FIG. 6 illustrates longitudinal spherical aberration, astigmatic field curvature, and distortion of the optical lens assembly 100-3 according to the third embodiment.

Fourth Embodiment

FIG. 7 illustrates the optical lens assembly 100-4 according to the fourth embodiment. Table 10 shows, for example, design data of the fourth embodiment.

TABLE 10

| Lens surface | R | Dn | H-Aper | EFL (e-line) | nd | vd |
|---|---|---|---|---|---|---|
| obj | infinity | D0 | | | | |
| 1* | 1.826 | 0.956 | 1.47 | 3.6352 | 1.5311 | 55.9 |
| 2* | 25.668 | 0.03 | 1.26 | | | |
| 3* | 11.792 | 0.23 | 1.19 | −6.694 | 1.64338 | 22.27 |
| 4* | 3.155 | 0.072 | 1.16 | | | |
| 5* | 3.054 | 0.329 | 1.04 | 12.9567 | 1.5311 | 55.9 |
| 6* | 5.266 | 0.087 | 0.92 | | | |
| 7* | 8.61 | 0.23 | 0.92 | −94.0111 | 1.5311 | 55.9 |
| 8(ST)* | 7.28 | D1 | 0.87 | | | |
| 9* | −3.849 | 0.3 | 0.89 | −9.4708 | 1.614 | 25.95 |
| 10* | −11.518 | 0.292 | 0.95 | | | |
| 11* | −2.297 | 0.3 | 0.99 | −5.2363 | 1.5311 | 55.9 |
| 12* | −13.533 | D2 | 1.2 | | | |
| 13* | −6.229 | 0.815 | 1.98 | −95.2559 | 1.65 | 21.52 |
| 14* | −7.276 | 0.03 | 2.42 | | | |
| 15 | infinity | 0.11 | 2.44 | | 1.5168 | 64.2 |
| 16 | infinity | D3 | 2.46 | | | |
| IMG | infinity | D4 | | | | |

Table 11 shows aspherical coefficients in the fourth embodiment.

TABLE 11

| | K | A | B | C | D | E |
|---|---|---|---|---|---|---|
| 1 | −6.15E−02 | 1.87E−04 | −1.59E−04 | 2.93E−03 | −7.44E−03 | 1.27E−02 |
| 2 | −1.44E+01 | −1.43E−02 | 2.67E−02 | −2.92E−02 | 1.91E−02 | −6.69E−03 |
| 3 | −6.71E+01 | 4.09E−02 | −6.11E−02 | 1.99E−01 | −5.70E−01 | 7.60E−01 |
| 4 | 3.90E−01 | 9.82E−02 | −3.51E−01 | 1.18E+00 | −2.93E+00 | 3.92E+00 |
| 5 | 8.26E−01 | −3.53E−03 | −2.37E−01 | 3.62E−01 | −2.36E−01 | 8.17E−02 |
| 6 | 1.92E+01 | 6.96E−02 | 4.65E−01 | −3.98E+00 | 1.18E+01 | −1.77E+01 |
| 7 | 7.43E+01 | 1.30E−01 | 4.73E−01 | −4.03E+00 | 1.02E+01 | −1.27E+01 |
| 8 | −6.05E+01 | −3.05E−03 | 2.70E−01 | −2.14E+00 | 6.00E+00 | −9.68E+00 |
| 9 | 1.26E+01 | −9.30E−02 | 1.46E−01 | 3.39E−01 | −2.97E−01 | −1.53E+00 |
| 10 | 7.36E+01 | −1.47E−01 | 4.41E−01 | −4.68E−01 | 2.44E+00 | −6.21E+00 |
| 11 | −5.90E+00 | −3.05E−01 | 5.93E−01 | −2.70E−01 | −1.09E−01 | 1.47E−01 |
| 12 | 7.94E+01 | −8.91E−02 | 2.42E−01 | −1.66E−01 | 1.53E−02 | 1.16E−02 |
| 13 | −5.12E+01 | −1.02E−01 | 1.10E−01 | −9.99E−02 | 6.74E−02 | −3.15E−02 |
| 14 | −4.55E+01 | −1.45E−01 | 1.23E−01 | −8.94E−02 | 4.42E−02 | −1.42E−02 |

Table 12 shows, in the optical lens assembly 100-4 according to the fourth embodiment, the variable distances D0, D1, D2, D3, and D4, the focal length $f_i$, the magnification MAG, the F number, the half field of view HFOV, and the total length TTL for the infinite object distance Pos1 and the object distance Pos2 having the magnification MAG of 0.01.

TABLE 12

|  | Pos1 | Pos2 |
|---|---|---|
| D0 | infinity | 940.4724 |
| D1 | 1.06824 | 1.09865 |
| D2 | 1.35111 | 1.32069 |
| D3 | 0.80951 | 0.80951 |
| D4 | −0.01 | −0.01 |
| in air | 0.902 | 0.902 |
| fi | 9.3988 | — |
| MAG | — | 0.01 |
| HFOV | 16.027 | 15.926 |
| Fno | 3.688 | 3.697 |
| TTL | 7 | 7 |

Figure 8:
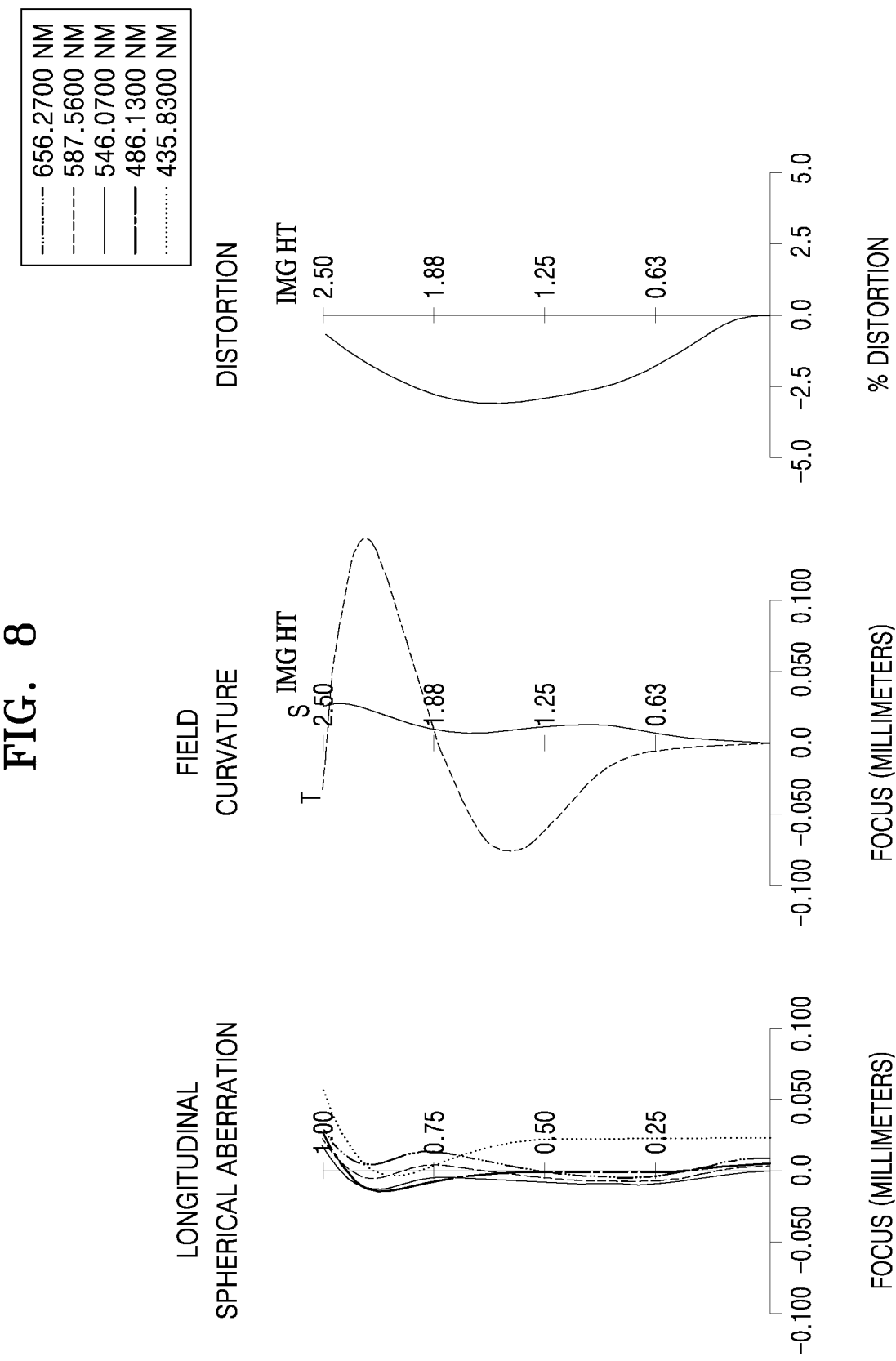
FIG. 8 illustrates aberration diagrams of the optical lens assembly of the fourth embodiment of the present disclosure.

FIG. 8 illustrates longitudinal spherical aberration, astigmatic field curvature, and distortion of the optical lens assembly 100-4 according to the fourth embodiment.

Fifth Embodiment

FIG. 9 illustrates the optical lens assembly 100-5 according to the fifth embodiment. Table 13 shows, for example, design data of the fifth embodiment.

TABLE 13

| Lens surface | R | Dn | H-Aper | EFL (e-line) | nd | vd |
|---|---|---|---|---|---|---|
| obj | infinity | D0 |  |  |  |  |
| 1* | 1.518 | 0.599 | 1.14 | 4.2848 | 1.5441 | 56.09 |
| 2* | 3.715 | 0.01 | 1.05 |  |  |  |
| 3* | 3.252 | 0.25 | 1.03 | −3.5535 | 1.82144 | 27.18 |
| 4* | 1.491 | 0.01 | 0.9 |  |  |  |
| 5* | 1.147 | 0.552 | 0.88 | 2.616 | 1.53431 | 56.4 |
| 6* | 5.225 | 0.166 | 0.78 |  |  |  |
| 7* | 6.232 | 0.235 | 0.69 | −26.7652 | 1.56354 | 40.96 |
| 8(ST)* | 4.357 | D1 | 0.61 |  |  |  |
| 9* | −1.979 | 0.22 | 0.69 | −2.3396 | 1.80459 | 42 |
| 10* | 45.989 | D2 | 0.77 |  |  |  |
| 11* | −2.617 | 0.35 | 1.47 | −2.4864 | 1.53236 | 55.45 |
| 12* | 2.827 | 0.09 | 1.61 |  |  |  |
| 13* | 2.648 | 0.612 | 1.74 | 3.2003 | 1.65 | 21.52 |
| 14* | −9.284 | D3 | 1.83 |  |  |  |
| 15 | infinity | 0.11 | 1.94 | 1.5168 | 64.2 |  |
| 16 | infinity | D4 | 1.96 |  |  |  |
| IMG | infinity | D5 |  |  |  |  |

Table 14 shows aspherical coefficients in the fifth embodiment.

TABLE 14

|  | K | A | B | C | D | E |
|---|---|---|---|---|---|---|
| 1 | −9.78E−02 | 3.25E−03 | −1.00E−02 | 4.23E−03 | −5.25E−03 | 3.07E−03 |
| 2 | −4.78E+00 | −2.51E−02 | 9.63E−02 | −1.83E−01 | 1.91E−01 | −1.21E−01 |
| 3 | −2.35E+01 | 2.99E−02 | 6.85E−02 | −1.28E−01 | 9.94E−02 | −4.38E−02 |
| 4 | −7.39E−01 | 4.53E−02 | −2.94E−01 | 7.78E−01 | −8.22E−01 | 2.93E−01 |
| 5 | 4.30E−02 | 7.94E−02 | −6.30E−01 | 1.27E+00 | −1.28E+00 | 7.32E−01 |
| 6 | 5.41E+00 | 4.71E−02 | 1.48E−01 | −2.50E+00 | 8.30E+00 | −1.29E+01 |
| 7 | 5.63E+01 | 3.16E−02 | −2.65E−01 | 5.03E−01 | −5.96E+00 | 3.03E+01 |
| 8 | −2.59E+00 | 6.79E−02 | 1.45E−01 | −1.34E+00 | 6.01E+00 | −1.23E+01 |
| 9 | 4.33E+00 | 1.51E−01 | −2.67E−01 | 2.52E−01 | 1.22E+00 | −1.39E+01 |
| 10 | −9.90E+01 | 1.95E−01 | 2.33E−01 | −2.36E+00 | 8.84E+00 | −2.10E+01 |
| 11 | 7.78E−01 | −1.10E−01 | 6.37E−01 | −1.02E+00 | 8.50E−01 | −3.81E−01 |
| 12 | 3.88E−01 | −1.04E+00 | 1.99E+00 | −1.92E+00 | 1.04E+00 | −3.57E−01 |
| 13 | −2.72E−02 | −8.06E−01 | 9.73E−01 | −1.92E−01 | −5.79E−01 | 6.27E−01 |
| 14 | 22.19112 | −2.45E−01 | 1.20E−01 | 1.79E−02 | −2.00E−02 | 3.85E−03 |

Table 15 shows, in the optical lens assembly 100-5 according to the fifth embodiment, the variable distances D0, D1, D2, D3, and D4, the focal length the magnification MAG, the F number, the half field of view HFOV, and the total length TTL for the infinite object distance Pos1 and the object distance Pos2 having the magnification MAG of 0.01.

TABLE 15

|  | Pos1 | Pos2 |
|---|---|---|
| D0 | infinity | 765.49395 |
| D1 | 0.7062 | 0.72631 |
| D2 | 1.00568 | 0.98557 |
| D3 | 0.1 | 0.1 |
| D4 | 0.49547 | 0.49547 |
| D5 | −0.03046 | −0.03046 |
| in air | 0.637 | 0.637 |
| fi | 7.65 | — |
| MAG | — | 0.01 |
| HFOV | 16.01 | 15.821 |
| Fno | 3.608 | 3.619 |
| TTL | 5.48 | 5.48 |

Figure 10:
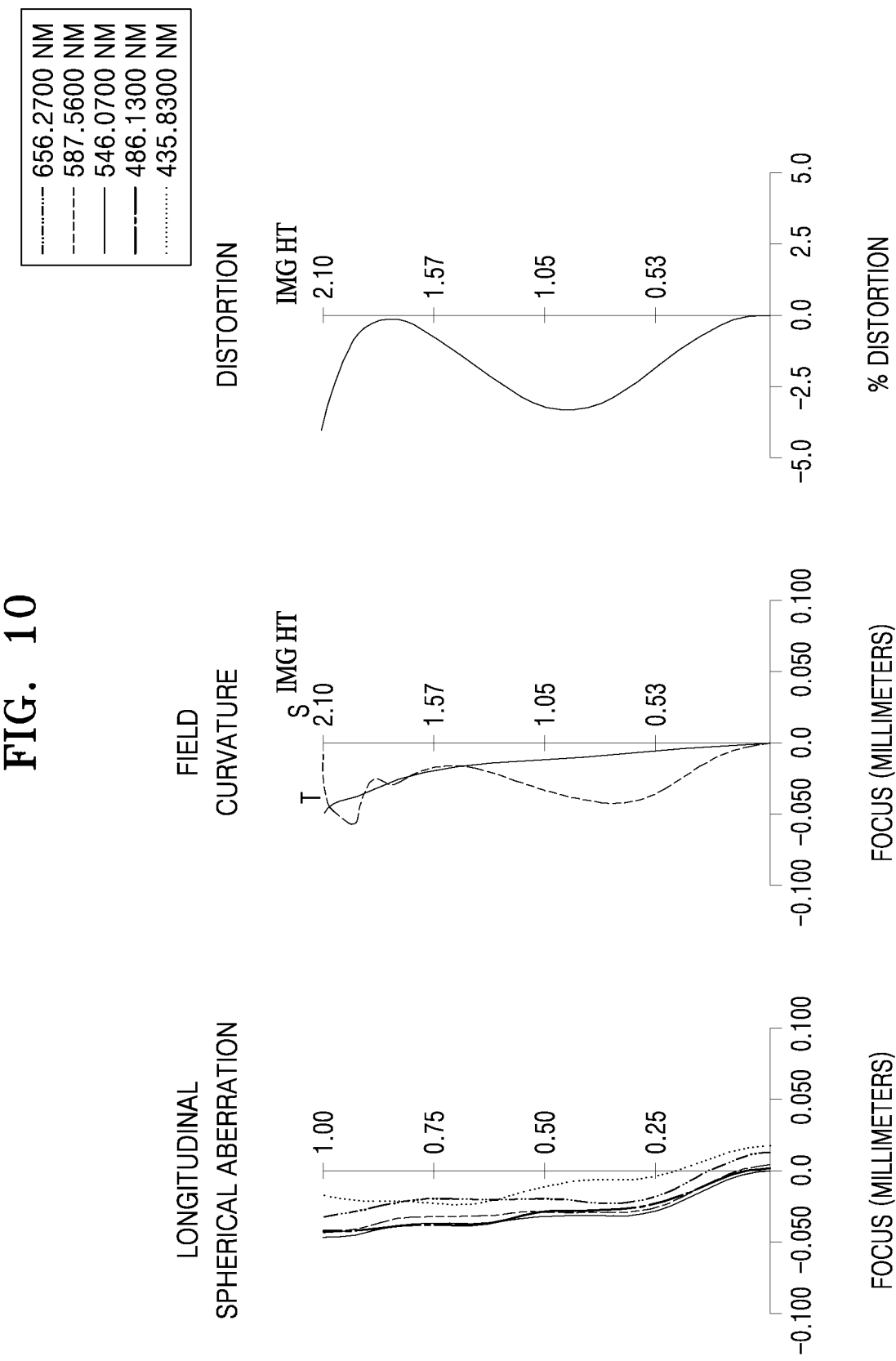
FIG. 10 illustrates aberration diagrams of the optical lens assembly of the fifth embodiment of the present disclosure.

FIG. 10 illustrates longitudinal spherical aberration, astigmatic field curvature, and distortion of the optical lens assembly 100-5 according to the fifth embodiment.

Table 16 shows that the optical lens assemblies 100-1 through 100-5 according to the first through fifth embodiments satisfy Formulae 1 through 8.

TABLE 16

|  | First embodiment | Second embodiment | Third embodiment | Fourth embodiment | Fifth embodiment |
|---|---|---|---|---|---|
| Formula 1 | −2.046 | −1.638 | −1.770 | −1.721 | −1.70 |
| Formula 2 | 23.415 | 11.917 | 26.133 | 24.369 | 19.098 |
| Formula 3 | 0.001 | 0.001 | 0.009 | 0.015 | 0.014 |
| Formula 4 | 0.900 | 0.800 | 0.677 | 3.111 | 3.827 |
| Formula 5 | 2.571 | 2.018 | 2.983 | 2.593 | 2.610 |
| Formula 6 | 0.786 | 0.925 | 0.942 | 0.745 | 0.716 |
| Formula 7 | 0.228 | 0.363 | 0.324 | 0.194 | 0.198 |
| Formula 8 | −1.61303 | −0.73579 | −1.14198 | −0.34619 | −0.30583 |

The optical lens assemblies according to various embodiments may be applied, for example, to electronic apparatuses including image sensors. The optical lens assemblies according to embodiments may be applied to various electronic apparatuses such as digital cameras, interchangeable lens cameras, video cameras, mobile phone cameras, and compact mobile device cameras.

Figure 11:
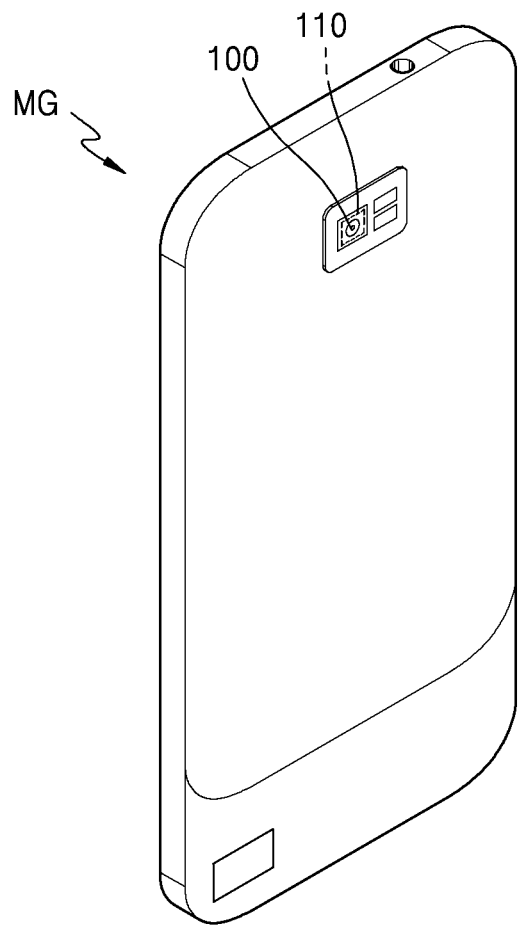
FIG. 11 illustrates an electronic apparatus including an optical lens assembly, according to an embodiment.

FIG. 11 illustrates an electronic apparatus MG including an optical lens assembly according to an embodiment.

Although the electronic apparatus MG is shown as a mobile phone in FIG. 11, the present disclosure is not limited thereto. The electronic apparatus MG may include at least one optical lens assembly 100 and an image sensor 110 that receives an image formed by the at least one optical lens assembly 100 and converts the received image into an electrical image signal. Any of the optical lens assemblies 100-1 through 100-5 described with reference to FIGS. 1 to 10 may be used as the optical lens assembly 100. Accordingly, a high-performance imaging device may be implemented by applying the optical lens assembly according to various embodiments to an imaging device such as a compact digital camera or a mobile phone.

Figure 12:
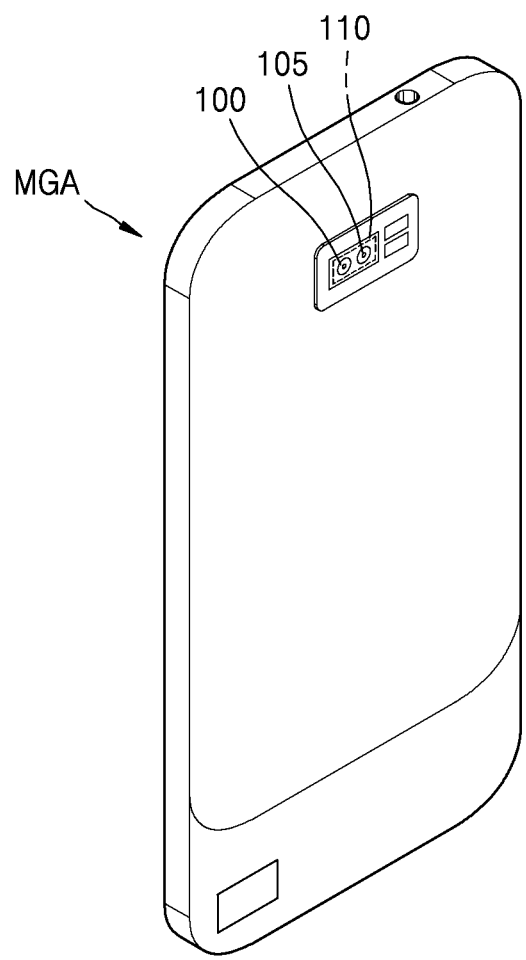
FIG. 12 illustrates an electronic apparatus including an optical lens assembly, according to another embodiment.

FIG. 12 illustrates an electronic apparatus MGA including an optical lens assembly according to another embodiment. The electronic apparatus MGA may include a plurality of optical lens assemblies having different angles of view.

For example, in order to obtain a zoom image having high resolution in a small mobile device, the mobile device may include both a wide-angle camera and a telephoto camera in a dual module. The optical lens assembly according to various embodiments may be used for a long focus telephoto lens needed to obtain a zoom image having high magnification. For example, the optical lens assembly according to various embodiments may have, for example, an equivalent focal length that is about 1.8 to 4 times greater than that of a wide-angle lens.

The electronic apparatus MGA may include, for example, the optical lens assembly 100 (referred to as first optical lens assembly), a second optical lens assembly 105, and the image sensor 110. For example, the first optical lens assembly 100 may be a telephoto lens system, and the second optical lens assembly 105 may be a standard lens system. Alternatively, the first optical lens assembly 100 may be a telephoto lens assembly, and the second optical lens assembly 105 may be a wide-angle lens system. As such, the electronic apparatus MGA may include a plurality of optical lens assemblies having different angles of view, and may take pictures by selectively using the optical lens assembly. When the first optical lens assembly 100 has a first field of view and the second optical lens assembly 105 has a second field of view, an image obtained by the first optical lens assembly 100 and an image obtained by the second optical lens assembly 105 may be combined to generate an image between the first field of view and the second field of view, thereby obtaining a zoom image.

An electronic apparatus 201 in a network environment 200 according to an embodiment will be described with reference to FIG. 13. The electronic apparatus 201 may include a bus 210, a processor 220, a camera module 225, a memory 230, an input/output (I/O) interface 250, a display 260, and a communication interface 270. In some embodiments, the electronic apparatus 201 may not include at least one of the above components or may further include other components.

The bus 210 may include, for example, a circuit for connecting the above components (210 to 270) and transmitting communication information (e.g., control messages and/or data) between the above components.

The processor 220 may include at least one of a central processing unit (CPU), an application processor (AP), and a communication processor (CP). For example, the processor 220 may execute control of one or more other components of the electronic apparatus 201 and/or data processing or operations related to communication.

For example, the camera module 225 may be configured to capture a still image and a moving image (video). According to an embodiment, the camera module 225 may include one or more image sensors (e.g., a front sensor or a rear sensor), a lens, an image signal processor (ISP), or a flash (e.g., a light-emitting diode (LED) or a xenon lamp). For example, the optical lens assemblies according to various embodiments may be applied to the camera module 225.

The memory 230 may include a volatile memory and/or a nonvolatile memory. For example, the memory 230 may store data or commands related to one or more other components of the electronic apparatus 201. According to an embodiment, the memory 230 may store software and/or a program 240. The program 240 may include, for example, a kernel 241, middleware 243, an application programming interface (API) 245, and/or an application program (or "application") 247. At least a part of the kernel 241, the middleware 243, and the API 245 may be referred to as an operating system (OS).

For example, the kernel 241 may control or manage system resources (e.g., the bus 210, the processor 220, or the memory 230) used to execute operations or functions implemented in other programs (e.g., the middleware 243, the API 245, or the application program 247). Also, the kernel 241 may provide an interface for controlling or managing the system resources when the middleware 243, the API 245, or the application program 247 accesses each component of the electronic apparatus 201.

For example, the middleware 243 may perform a relay function so that the API 245 or the application program 247 may communicate data with the kernel 241.

Also, the middleware 243 may process one or more operation requests received from the application program 247 according to the priority thereof. For example, the middleware 243 may give at least one of the application programs 247 the priority to use the system resource (e.g., the bus 210, the processor 220, or the memory 230) of the electronic apparatus 201. For example, the middleware 243 may perform scheduling or load balancing on the one or more operation requests by processing the one or more operation requests according to the priority given to the at least one.

For example, the API 245 may be an interface for the application 247 to control a function provided by the kernel 241 or the middleware 243, and may include at least one interface or function (e.g., instructions) for file control, window control, image processing, or character control.

For example, the I/O interface 250 may function as an interface for transmitting a command or data input from a user or another external device to one or more other components of the electronic apparatus 201. Also, the I/O interface 250 may output a command or data received from one or more other components of the electronic apparatus 201 to the user or another external device.

The display 260 may include, for example, a liquid crystal display (LCD), a light-emitting diode (LED) display, an organic light-emitting diode (OLED) display, a microelectromechanical system (MEMS) display, or an electronic paper display. For example, the display 260 may display various types of content (e.g., text, images, videos, icons, or symbols) to the user. For example, the display 260 may include a touchscreen and may receive a touch, a gesture, a proximity, or a hovering input by using an electronic pen or a body part of the user.

For example, the communication interface 270 may set communication between the electronic apparatus 201 and an external device (e.g., a first external electronic apparatus 202, a second external electronic apparatus 204, or a server 206). For example, by wireless communication or wired communication, the communication interface 270 may be connected to a network 262 to communicate with the external device (e.g., the second external electronic apparatus 204 or the server 206).

The wireless communication may use, for example, at least one of Long-Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), and Global System for Mobile communication (GSM) as cellular communication protocol. Also, the wireless communication may include, for example, short-range communication 264. The short-range communication 264 may include, for example, at least one of Wireless Fidelity (WiFi), Bluetooth, Near-Field Communication (NFC), and Global Navigation Satellite System (GNSS). The GNSS may include, for example, at least one of Global Positioning System (GPS), Global Navigation Satellite System (GLONASS), BeiDou Navigation Satellite System (hereinafter referred to as "BeiDou"), and Galileo (or the European global satellite-based navigation system) according to regions or bandwidths. Hereinafter, the term "GPS" may be interchangeably used with the term "GNSS". The wired communication may include, for example, at least one of universal serial bus (USB), high-definition multimedia interface (HDMI), recommended standard-232 (RS-232), and plain old telephone service (POTS). The network 262 may include, for example, at least one of a telecommunications network, a computer network (e.g., Local Area Network (LAN) or Wide Area Network (WAN)), the Internet, and a telephone network.

Each of the first and second external electronic apparatuses 202 and 204 may be similar to or different in type from the electronic apparatus 201. According to an embodiment, the server 206 may include a group of one or more servers. According to various embodiments, all or some of operations executed in the electronic apparatus 201 may be executed in one or more other electronic apparatuses (e.g., the external electronic apparatus 202 or 204 or the server 206). According to an embodiment, when the electronic apparatus 201 needs to perform a function or a service automatically or at the request, the electronic apparatus 201 may request other devices (e.g., the external electronic apparatus 202 or 204 or the server 206) for at least some functions related thereto in addition to or instead of directly executing the function or the service. The other electronic apparatuses (e.g., the external electronic apparatus 202 or 204 or the server 206) may execute the requested function or the additional function and transmit the execution results to the electronic apparatus 201. The electronic apparatus 201 may provide the requested function or service by processing the received execution results additionally or without change. To this end, for example, cloud computing, distributed computing, or client-server computing technology may be used.

Figure 14:
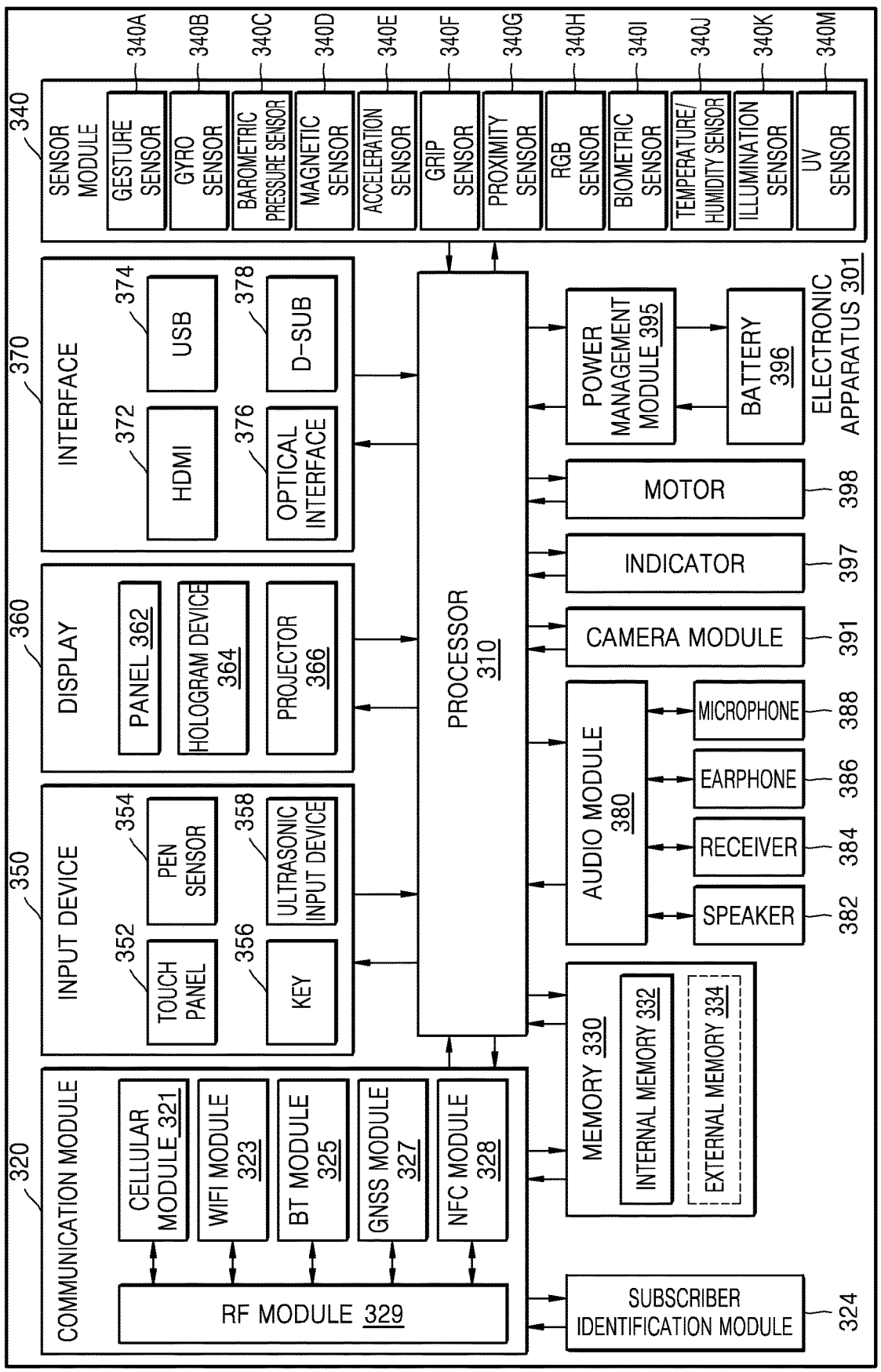
FIG. 14 is a block diagram of an electronic apparatus according to an embodiment.

FIG. 14 is a block diagram of an electronic apparatus 301 according to an embodiment. The electronic apparatus 301 may include, for example, all or some of the electronic apparatus 201 illustrated in FIG. 12. The electronic apparatus 301 may include at least one processor (e.g., an AP) 310, a communication module 320, a subscriber identification module (SIM) 324, a memory 330, a sensor module 340, an input device 350, a display 360, an interface 370, an audio module 380, a camera module 391, a power management module 395, a battery 396, an indicator 397, and a motor 398.

For example, by driving an OS or an application program, the processor 310 may control a plurality of hardware or software components connected to the processor 310 and perform various data processing and operations. The processor 310 may be implemented, for example, as a system-on-chip (SoC). According to an embodiment, the processor 310 may further include a graphics processing unit (GPU) and/or an image signal processor. The processor 310 may include at least some (e.g., a cellular module 321) of the components illustrated in FIG. 14. The processor 310 may load a command or data received from at least one of other components (e.g., a nonvolatile memory) into a volatile memory and process the loaded data, and the processor 310 may store various data in the nonvolatile memory.

Figure 13:
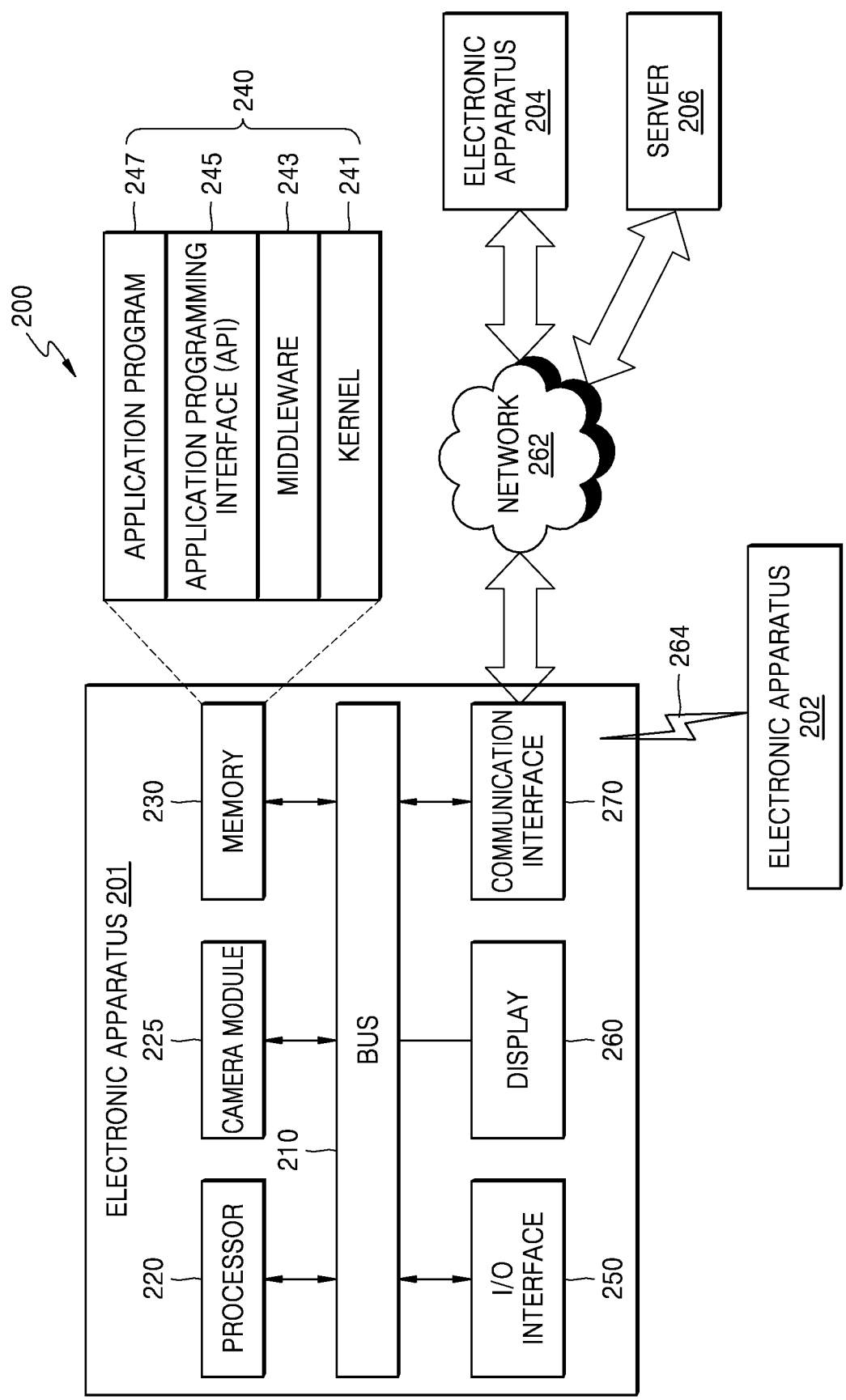
FIG. 13 illustrates a network environment system according to an embodiment.

The communication module 320 may have an identical or similar configuration to the communication interface 270 of FIG. 13. The communication module 320 may include, for example, the cellular module 321, a WiFi module 323, a Bluetooth (BT) module 325, a GNSS module 327 (e.g., a GPS module, a GLONASS module, a BeiDou module, or a Galileo module), an NFC module 328, and a radio frequency (RF) module 329.

The cellular module 321 may provide, for example, a voice call service, a video call service, a text message service, or an Internet service through a communication network. According to an embodiment, the cellular module 321 may identify and authenticate the electronic apparatus 301 in the communication network by using the subscriber identification module (e.g., a SIM card) 324. According to an embodiment, the cellular module 321 may perform at least some of functions that may be provided by the processor 310. According to an embodiment, the cellular module 321 may include a CP.

Each of the WiFi module 323, the BT module 325, the GNSS module 327, and the NFC module 328 may include, for example, a processor for processing data transmitted/received through the corresponding module. According to some embodiments, at least some (e.g., two or more) of the cellular module 321, the WiFi module 323, the BT module 325, the GNSS module 327, and the NFC module 328 may be included in an integrated chip (IC) or an IC package.

The RF module 329 may transmit/receive, for example, a communication signal (e.g., an RF signal). The RF module 329 may include, for example, a transceiver, a power amplifier module (PAM), a frequency filter, a low-noise amplifier (LNA), or an antenna. According to other embodiments, at least one of the cellular module 321, the WiFi module 323, the BT module 325, the GNSS module 327, and the NFC module 328 may transmit/receive an RF signal through a separate RF module.

For example, the subscriber identification module 324 may include an embedded SIM and/or a card including a SIM, and may include unique identification information (e.g., integrated circuit card identifier (ICCID)) or subscriber information (e.g., international mobile subscriber identity (IMSI)).

The memory 330 may include, for example, an internal memory 332 or an external memory 334. The internal memory 332 may include, for example, at least one of volatile memories (e.g., dynamic random-access memories (DRAMs), static RAMs (SRAMs), or synchronous DRAMs (SDRAMs)) and nonvolatile memories (e.g., one-time programmable read-only memories (OTPROMs), programmable ROMs (PROMs), erasable and programmable ROMs (EPROMs), electrically erasable and programmable ROMs (EEPROMs), mask ROMs, flash ROMs, flash memories (e.g., NAND flash memories or NOR flash memories), hard disk drives (HDDs), or solid state drives (SSDs)).

The external memory 334 may further include, for example, a flash drive such as compact flash (CF), secure digital (SD), micro secure digital (micro-SD), mini secure digital (mini-SD), extreme digital (xD), multimedia card (MMC), or memory stick. The external memory 334 may be operatively and/or physically connected to the electronic apparatus 301 through various interfaces.

For example, the sensor module 340 may measure a physical quantity or detect an operation state of the electronic apparatus 301 and convert the measured or detected information into an electrical signal. The sensor module 340 may include, for example, at least one of a gesture sensor 340A, a gyro sensor 340B, a barometric pressure sensor 340C, a magnetic sensor 340D, an acceleration sensor 340E, a grip sensor 340F, a proximity sensor 340G, a color sensor 340H (e.g., an red/green/blue (RGB) sensor), a biometric sensor 340I, a temperature/humidity sensor 340J, an illumination sensor 340K, and an ultraviolet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit configured to control at least one sensor included therein. In some embodiments, the electronic apparatus 301 may further include a processor, which is configured separately or as a portion of the processor 310 to control the sensor module 340, to control the sensor module 340 while the processor 310 is in a sleep state.

The input device 350 may include, for example, a touch panel 352, a (digital) pen sensor 354, a key 356, or an ultrasonic input device 358. The touch panel 352 may include, for example, at least one of a capacitive touch panel, a resistive touch panel, an infrared touch panel, and an ultrasonic touch panel. Also, the touch panel 352 may further include a control circuit. The touch panel 352 may further include a tactile layer configured to provide a tactile response to the user.

For example, the (digital) pen sensor 354 may be a portion of the touch panel 352 or may include a separate recognition sheet. The key 356 may include, for example, a physical button, an optical key, or a keypad. The ultrasonic input device 358 may detect an ultrasonic wave generated by an input tool through a microphone 388 and may detect data corresponding to the detected ultrasonic wave.

The display 360 may include a panel 362, a hologram device 364, or a projector 366. The panel 362 may have an identical or similar configuration to the display 260 of FIG. 13. For example, the panel 362 may be implemented to be flexible, transparent, or wearable. The panel 362 and the touch panel 352 may be configured as one module. According to an embodiment, the panel 362 may include a pressure sensor (or a force sensor) that may measure a pressure strength of a user touch. The pressure sensor may be implemented integrally with the touch panel 352, or may be implemented as one or more sensors separately from the touch panel 352. The hologram device 364 may display a stereoscopic image in the air by using light interference. The projector 366 may display an image by projecting light onto a screen. For example, the screen may be located inside or outside the electronic apparatus 301. According to an embodiment, the display 360 may further include a control circuit for controlling the panel 362, the hologram device 364, or the projector 366.

The interface 370 may include, for example, an HDMI 372, a USB 374, an optical interface 376, or a D-subminiature (D-SUB) 378. For example, the interface 370 may be included in the communication interface 270 illustrated in FIG. 13. Additionally or alternatively, the interface 370 may include, for example, a mobile high-definition link (MHL) interface, a secure digital (SD) card/multimedia card (MMC) interface, or an infrared data association (IrDA) standard interface.

For example, the audio module 380 may perform bidirectional conversion between a sound and an electrical signal. For example, at least some components of the audio module 380 may be included in the I/O interface 250 illustrated in FIG. 13. For example, the audio module 380 may process sound information that is input or output through a speaker 382, a receiver 384, an earphone 386, or the microphone 388.

For example, the camera module 391 may be configured to capture a still image and a moving image (video). According to an embodiment, the camera module 391 may include one or more image sensors (e.g., a front sensor or a rear sensor), a lens, an ISP, or a flash (e.g., an LED or a xenon lamp). For example, the optical lens assemblies according to various embodiments may be applied to the camera module 391.

For example, the power management module 395 may manage power of the electronic apparatus 301. The electronic apparatus 301 may be, but is not limited to, an electronic apparatus that is powered by a battery. According to an embodiment, the power management module 395 may include a power management integrated circuit (PMIC), a charger integrated circuit (IC), or a battery or fuel gauge. The PMIC may have a wired and/or wireless charge mode. For example, the wireless charge mode may include a magnetic resonance mode, a magnetic induction mode, or an electromagnetic wave mode and may further include an additional wireless charge circuit such as a coil loop, a resonant circuit, or a rectifier. For example, the battery gauge may be configured to measure a residual capacity, a charged voltage, a current, or a temperature of the battery 396. The battery 396 may include, for example, a rechargeable battery and/or a solar battery.

The indicator 397 may indicate a particular state of the electronic apparatus 301 or a portion thereof (e.g., the processor 310), such as a booting state, a message state, or a charge state. For example, the motor 398 may be configured to convert an electrical signal into a mechanical vibration and may generate a vibration or a haptic effect. Although not shown in FIG. 14, the electronic apparatus 301 may include a processing device (e.g., a GPU) for supporting a mobile TV. For example, the processing device for supporting a mobile TV may process media data according to the standards such as digital multimedia broadcasting (DMB), digital video broadcasting (DVB), or MediaFLO™.

An optical lens assembly according to various embodiments may include: a first lens group having positive refractive power and is fixed during focusing; and a second lens group configured to move along an optical axis for focusing, wherein the first lens group and the second lens group are arranged from an object side to an image side, and the optical lens assembly satisfies the following formula:

$$5 < \frac{TTL}{\mathrm{Tan}\theta} < 40$$

where TTL denotes a total length of the optical lens assembly, and θ denotes a half field of view angle of the optical lens assembly when focusing at an infinite object distance.

The optical lens assembly may satisfy the following formula:

$$-3 < \log\frac{|f_i - f_f|}{f_i} < -1$$

where $f_i$ denotes a total focal length of the optical lens assembly when focusing at the infinite object distance, and $f_f$ denotes a total focal length of the optical lens assembly when focusing at a position where the optical lens assembly has a magnification of 0.01.

The optical lens assembly may satisfy the following formulae:

$$0 < \left|\frac{TAS}{\theta}\right| < 0.03$$
$$0.3 < |(1 - m_f^2) \cdot m_r^2| < 5.0$$

where TAS denotes a Seidel tertiary astigmatism of the second lens group, $m_f$ denotes a magnification of the second lens group, and $m_r$ denotes a combined magnification of a lens group located between the second lens group and the image side.

The optical lens assembly may satisfy the following formulae:

$$1.0 < \frac{TTL}{Y_{IM}} < 4.0$$
$$0.7 < \frac{TTL}{f_i} < 1.0$$

where $f_i$ denotes a total focal length of the optical lens assembly when focusing at the infinite object distance, and $Y_{IM}$ denotes an image height.

A lens located closest to the object side in the first lens group may be an aspherical lens.

The first lens group may include a first lens located closest to the object side, and the optical lens assembly may satisfy the following formula:

$$0.1 < \frac{R_1}{f_i} < 0.5$$

where $R_1$ denotes a radius of curvature of an object-side surface of the first lens.

The optical lens assembly may have a field of view angle ranging from about 25° to about 50°.

The second lens group may have a negative refractive power.

The second lens group may include one or two lenses.

The optical lens assembly may further include a third lens group located between the second lens group and the image side and having a positive or negative refractive power.

A stop may be provided in the first lens group.

The first lens group may include three lenses that are sequentially arranged from the object side to the image side, and each of the three lenses has a meniscus shape convex toward the object side.

An optical lens assembly according to various embodiments may include: a first lens group fixed during focusing; and a second lens group set to move along an optical axis for focusing, wherein the first lens group and the second lens group are arranged from an object side to an image side, and the optical lens assembly satisfies the following formula:

$$-2.0 < f_w/f_i < 0$$

where $f_i$ denotes a total focal length of the optical lens assembly when focusing at an infinite object distance, and $f_w$ denotes a focal length of the second lens group.

The optical lens assembly may satisfy the following formula:

$$5 < \frac{TTL}{\text{Tan}\beta} < 40$$

where TTL denotes a total length of the optical lens assembly, and θ denotes a half field of view angle of the optical lens assembly when focusing at the infinite object distance.

The optical lens assembly may satisfy the following formula:

$$-3 < \log\frac{|f_i - f_f|}{f_i} < -1$$

where $f_i$ denotes a total focal length of the optical lens assembly when focusing at the infinite object distance, and $f_f$ denotes a total focal length of the optical lens assembly when focusing at a position where the optical lens assembly has a magnification of 0.01.

The optical lens assembly may satisfy the following formulae:

$$0 < \left|\frac{TAS}{\theta}\right| < 0.03$$
$$0.3 < |(1 - m_f^2) \cdot m_r^2| < 5.0$$

where TAS denotes a Seidel tertiary astigmatism of the second lens group, $m_f$ denotes a magnification of the second lens group, and $m_r$ denotes a combined magnification of a lens group located between the second lens group and the image side.

The optical lens assembly may have a field of view angle ranging from about 25° to about 50°.

An electronic apparatus according to various embodiments may include: an optical lens assembly; and an image sensor configured to receive light from the optical lens assembly, wherein the optical lens assembly includes: a first lens group having positive refractive power and is fixed during focusing; and a second lens group set to move along an optical axis for focusing, wherein the first lens group and the second lens group are arranged from an object side to an image side, and the optical lens assembly satisfies the following formula:

$$5 < \frac{TTL}{\text{Tan}\theta} < 40$$

where TTL denotes a total length of the optical lens assembly, and θ denotes a half field of view angle of the optical lens assembly when focusing at an infinite object distance.

The optical lens assembly may have a field of view angle ranging from about from about 25° to about 50°, and the electronic apparatus may further include a second optical lens assembly having a field of view angle different from the field of view angle of the optical lens assembly.

Each of the elements described herein may be configured as one or more components, and the names of the elements may vary according to the type of the electronic apparatus. According to various embodiments, the electronic apparatus may include at least one of the elements described herein, and some elements may be omitted or additional elements may be further included. Also, according to various embodiments, some of the elements of the electronic apparatus may be combined into one entity to perform the same functions as the previous elements prior to the combination thereof.

The term "module" used herein may refer to, for example, a unit including hardware, software, firmware, or any combination thereof, depending on the context. For example, the term "module" may be interchangeably used with terms such as "unit," "logic," "logical block," "component," or "circuit." The "module" may be a portion of an integrated component or an entirety thereof, and may perform one or more functions. The "module" may be implemented mechanically or electronically. For example, the "module" may include at least one of an application-specific integrated circuit (ASIC) chip, a field-programmable gate array (FPGA), and a programmable-logic device for performing some operations, which are known or to be developed.

At least a portion of the apparatus (e.g., modules or functions thereof) or method (e.g., operations) according to various embodiments may be implemented in the form of a program module by instructions stored in computer-readable storage media. When the instructions are executed by a processor (e.g., the processor 220 of FIG. 13), the one or more processors may perform a function corresponding to the instructions. The computer-readable storage media may include, for example, the memory 230.

The computer-readable storage media may include, for example, hard disks, floppy disks, magnetic media (e.g., magnetic tapes), optical media (e.g., compact disk read-only memory (CD-ROM), digital versatile disk (DVD), magneto-optical media (e.g., floptical disks), or hardware devices (e.g., read-only memories (ROMs), random-access memories (RAMs), or flash memories). Also, the program commands may include machine language codes that may be generated by a compiler, and high-level language codes that may be executed by a computer by using an interpreter. The hardware device may be configured to operate as one or more software modules in order to perform the operation of various embodiments, and vice versa. The program module or the module according to various embodiments may include at least one of the above elements, some of the above elements may be omitted, or additional other elements may be further included therein. The operations performed by the module, the program module, or other elements according to various embodiments may be executed in a sequential, parallel, repeated, or heuristic manner. Also, some operations may be executed in different order or omitted, or other operations may be additionally executed. The embodiments described herein should be considered in a descriptive sense only and not for purposes of limitation. Therefore, the scope of the present disclosure should be interpreted as including all modifications or various other embodiments based on the technical concept of the present disclosure. The above embodiments are merely examples, and one of ordinary skill in the art may derive various modifications and other equivalent embodiments therefrom. Thus, the spirit and scope of the present disclosure should be defined by the following claims.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An optical lens assembly comprising:
a first lens group having positive refractive power, is fixed during focusing, and comprising at least three lenses; and
a second lens group configured to move along an optical axis for focusing,
wherein the first lens group and the second lens group are arranged from an object side to an image side, and
the optical lens assembly satisfies the following formula:

$$5 < \frac{TTL}{\operatorname{Tan}\theta} < 40$$

where TTL denotes a total length of the optical lens assembly in millimeters, and θ denotes a half field of view angle of the optical lens assembly when focusing at an infinite object distance.

2. The optical lens assembly of claim 1, wherein the optical lens assembly satisfies the following formula:

$$-3 < \log\frac{|f_i - f_f|}{f_i} < -1$$

where $f_i$ denotes a total focal length of the optical lens assembly when focusing at the infinite object distance, and $f_f$ denotes a total focal length of the optical lens assembly when focusing at a position where the optical lens assembly has a magnification of 0.01.

3. The optical lens assembly of claim 1, wherein the optical lens assembly satisfies the following formulae:

$$0 < \left|\frac{TAS}{\theta}\right| < 0.03$$

$$0.3 < |(1 - m_f^2) \cdot m_r^2| < 5.0$$

where TAS denotes a Seidel tertiary astigmatism of the second lens group, $m_f$ denotes a magnification of the second lens group, and $m_r$ denotes a combined magnification of a lens group located between the second lens group and the image side.

4. An optical lens assembly comprising:
a first lens group having positive refractive power is fixed during focusing; and
a second lens group configured to move along an optical axis for focusing,
wherein the first lens group and the second lens group are arranged from an object side to an image side, and
the optical lens assembly satisfies the following formula:

$$5 < \frac{TTL}{\operatorname{Tan}\theta} < 40$$

where TTL denotes a total length of the optical lens assembly in millimeters, and θ denotes a half field of view angle of the optical lens assembly when focusing at an infinite object distance, wherein the optical lens assembly satisfies the following formulae:

$$1.0 < \frac{TTL}{Y_{IM}} < 4.0$$

$$0.7 < \frac{TTL}{f_i} < 1.0$$

where $f_i$ denotes a total focal length of the optical lens assembly when focusing at the infinite object distance, and $Y_{IM}$ denotes an image height.

5. The optical lens assembly of claim 1, wherein a lens located closest to the object side in the first lens group is an aspherical lens.

6. The optical lens assembly of claim 1, wherein the first lens group comprises a first lens located closest to the object side, and the optical lens assembly satisfies the following formula:

$$0.1 < \frac{R_1}{f_i} < 0.5$$

where $R_1$ denotes a radius of curvature of an object-side surface of the first lens.

7. The optical lens assembly of claim 1, wherein the optical lens assembly has a field of view angle ranging from about 25° to about 50°.

8. The optical lens assembly of claim 1, wherein the second lens group has negative refractive power.

9. The optical lens assembly of claim 1, wherein the second lens group comprises one or two lenses.

10. The optical lens assembly of claim 1, further comprising a third lens group located between the second lens group and the image side and having positive or negative refractive power.

11. The optical lens assembly of claim 1, wherein a stop is provided in the first lens group.

12. The optical lens assembly of claim 1, wherein the first lens group comprises three lenses that are sequentially arranged from the object side to the image side, and each of the three lenses has a meniscus shape convex toward the object side.

13. An electronic apparatus comprising:
an optical lens assembly; and
an image sensor configured to receive light from the optical lens assembly,
wherein the optical lens assembly comprises:
a first lens group having positive refractive power, is fixed during focusing, and comprising at least three lenses; and
a second lens group configured to move along an optical axis for focusing,
wherein the first lens group and the second lens group are arranged from an object side to an image side, and
the optical lens assembly satisfies the following formula:

$$5 < \frac{TTL}{\text{Tan}\theta} < 40$$

where TTL denotes a total length of the optical lens assembly in millimeters, and θ denotes a half field of view angle of the optical lens assembly when focusing at an infinite object distance.

14. The electronic apparatus of claim 13, wherein the optical lens assembly has a field of view angle ranging from about from about 25° to about 50°, and the electronic apparatus further comprises a second optical lens assembly having a field of view angle different from the field of view angle of the optical lens assembly.

15. The electronic apparatus of claim 13, wherein the electronic apparatus satisfies the following formula:

$$-3 < \log\frac{|f_i - f_f|}{f_i} < -1$$

where $f_i$ denotes a total focal length of the optical lens assembly when focusing at the infinite object distance, and $f_f$ denotes a total focal length of the optical lens assembly when focusing at a position where the optical lens assembly has a magnification of 0.01.

16. The optical lens assembly of claim 1, wherein first lens group includes a first lens located closest to the object side that has a meniscus shape convex toward the object side.

* * * * *